United States Patent
Numao et al.

(10) Patent No.: US 6,512,835 B1
(45) Date of Patent: Jan. 28, 2003

(54) DATA HIDING AND EXTRACTION METHODS

(75) Inventors: Masayuki Numao, Kanagawa-ken (JP); Shuichi Shimizu, Kanagawa-ken (JP); Norishige Morimoto, Tokyo (JP); Mei Kobayashi, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/480,024

(22) Filed: Jan. 10, 2000

Related U.S. Application Data

(62) Division of application No. 08/867,996, filed on Jun. 3, 1997, now Pat. No. 6,055,321.

(30) Foreign Application Priority Data

Jun. 20, 1996 (JP) .............................. 8-159330

(51) Int. Cl.$^7$ .............................. G06K 9/00; H04N 7/00; H04N 7/16
(52) U.S. Cl. ........................ 382/100; 348/460; 725/22
(58) Field of Search ............................ 382/100; 725/9, 725/20, 22; 348/460, 461, 463

(56) References Cited

U.S. PATENT DOCUMENTS

| | | | | |
|---|---|---|---|---|
| 4,969,041 A | * | 11/1990 | O'Grady et al. ............ 358/142 |
| 5,319,453 A | * | 6/1994 | Copriviza et al. ............ 348/6 |
| 5,379,345 A | * | 1/1995 | Greenberg ................... 380/23 |
| 5,652,626 A | * | 7/1997 | Kawakami et al. ......... 348/463 |
| 5,659,726 A | * | 8/1997 | Sandford et al. ........... 358/464 |
| 5,689,587 A | | 11/1997 | Bender et al. |
| 5,721,788 A | | 2/1998 | Powell et al. |
| 5,748,783 A | | 5/1998 | Rhoads |
| 5,987,127 A | * | 11/1999 | Ikenoue et al. ............ 358/401 |

FOREIGN PATENT DOCUMENTS

JP 6-22119 1/1994
JP 7-123244 5/1995

OTHER PUBLICATIONS

Binary data transmission over video channels with very low amplitude data signals, Fernseh– und Kino–Technik, vol. 32, No. 7, Jul. 1978 , by W. Szepanski.*

"Text and Video Communication" presented at the Conference of the Communicaitons Engineering society (NTG), Oct. 3, 1980 by W. Szepanski.*

A promotional brochure from Cypertech Systems Inc. dated Nov. 1992.*

* cited by examiner

Primary Examiner—Joseph Mancuso
Assistant Examiner—Martin Miller
(74) Attorney, Agent, or Firm—Scully, Scott, Murphy & Presser; Louis P. Herzberg

(57) ABSTRACT

The present invention provides a data hiding method of hiding media data in message data and a data extraction method of extracting the hidden data wherein message data is dispersively hidden in media data such as an image or sound to prevent a third person from modifying the message data easily.

More specifically, the present invention relates to a data hiding method in which media data is expressed as a media array while message data is expressed as a message array so that the array elements of the message array can be dispersively hidden in the message array based on a state values specifying a particular array element of the media array, comprising the steps of:

(a) determining the j-th ($j \geq 0$) state value $S_j$;

(b) determining (j+1)-th state value $S_{j+1}$ based on the j-th state value, the array element of the media array indicated by the j-th state value, and the array element of the message array; and (c) hiding data with respect to the array element of the media array indicated by the (j+1)-th state value $S_{j+1}$.

30 Claims, 17 Drawing Sheets

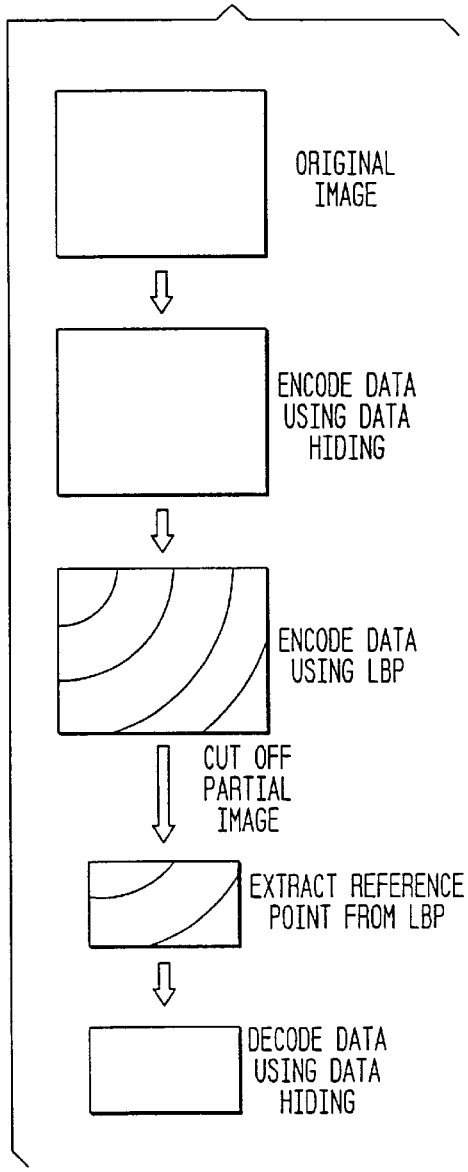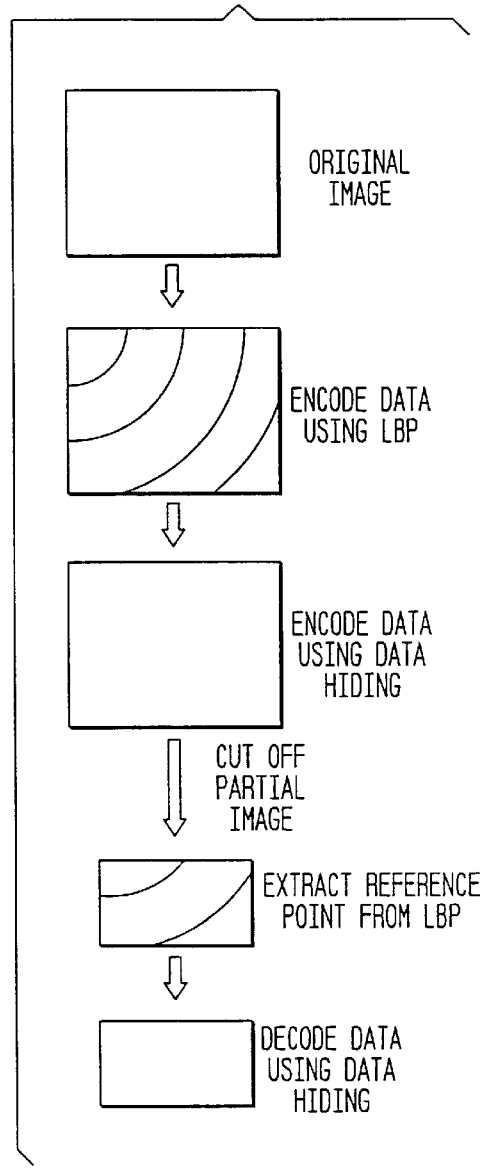

US 6,512,835 B1

DATA HIDING AND EXTRACTION METHODS

This application is a divisional of U.S. application Ser. No. 08/867,996, filed Jun. 3, 1997 now U.S. Pat. No. 6,055,321.

BACKGROUND OF THE INVENTION

1. Technical Field

The present invention relates to a data hiding method for hiding message data in media data and a data extraction method for extracting the hidden data.

2. Prior Art

Due to the development of multimedia-oriented society, a large amount of digitalized image and sound information is distributed over Internet or as recording media such as CD-ROMs, DVD-ROMs (or DVD-RAMs), or DVCs. Since anyone can simply make a complete copy of such digitalized information which is unlikely to be degraded, its unfair use is a problem. To prevent a third person from unfairly copying media data such as image or sound data, attention is being paid to a hiding technology that hides in original media data, information such as the sign of the author. If digitalized image data is illegally copied, the sign hidden in the copy can be checked to identify its source in order to determine whether it has been illegally made. Such a technology is called "data hiding".

FIG. 1 is a half tone image comprising digitalized data shown on a display. Photo description (messages) such as a "nurse", a "river", a "kindergarten pupil", and a "bird" is hidden in the media data, that is, the digitalized image in FIG. 1(a), as shown in FIG. 1(b). Media data can be obtained by dividing an image from a photograph into small points and determining the numerical values of the brightness and color of each point. In this case, the original numerical values of the image are intentionally somewhat changed. Very small changes in the numerical values do not substantially disturb the image and are not perceived by users. This nature can be used to hide completely different information (message data) in the original image. Message data hidden in the image may include any information and may be, for example, a lattice pattern, a rule-like figure, or the sign of the producer of the image. Message data hidden in media data can be extracted by processing with a special program. Thus, based on the extracted message data, it can be determined whether the original media data has been modified.

Each of the messages shown in FIG. 1(b) is hidden near a meaningful region on the image. For example, the message "bird" is hidden near the region in which the bird in the image is present, and acts as a caption. To hide a message such as information on the owner in the image, the message is preferably distributed over the image. This is because the message, which is locally hidden, may degrade the quality of that region when its amount is large. In addition, if part of the image is cut off, it is likely to be able to extract the message if it is distributed over the image. Thus, how to determine where each message piece is hidden is important. The positions are determined on the bases of a state sequence S. That is, each element of the state sequence is associated with each message and the message is hidden at the corresponding position determined on the basis of the element.

According to conventional data hiding methods, the state sequence S has been determined by a random number sequence. FIG. 2 schematically shows a layout of message data distributed on an image according to conventional methods. The image shown in FIG. 1(a) is divided into I image regions, each of which is numbered from 0 to 9. Then, message data is expressed as a message array (m), and an array element is described as an array value m[n] ($0 \leq n \leq 9$). Each array value is associated with divided message data. Each message is hidden at the position in the image specified on the basis of the element in the state sequence S. The following equations determine a position p0 at which 0th message m[0] is hidden.

State value $S_0$=initial value (constant)

Position $p_0 = S_0 \bmod I$ [Equation 1]

The above equations indicate that after a constant has been given as the initial value of the state value $S_0$, the remainder of I (the number of image regions) relative to the state value $S_0$ is $P_0$. The value of the position $P_0$ is any integral value between 0 and (I-1). By associating the integral values with the order of the image regions, the message m[0] is hidden in the i-th image region. The locations $P_n$ of the first and subsequent messages m[n] on the basis of the following equation.

$S_n = Rnd(S_{n-1})$ $P_n = S_n \bmod I$ [Equation 2]

These equations indicate that the preceding state value $S_{n-1}$ is used as the seed of a random number to generate a pseudo random number array, which is used as the next state value $S_n$. The remainder of I relative to the state value $S_n$ is the position $P_n$. The message m[n] is hidden in the image region corresponding to this value.

The hidden message can be read only by users who know the state value $S_0$ (initial value). If the message is extracted, all the state values ($S_1, \ldots, S_9$) following the state value $S_0$ are calculated on the basis of the initial value. The positions corresponding to the state values are identified and the messages hidden at these positions are extracted.

As is seen in FIG. 2, since the state value $S_n$ used to determine the position on the image of the n-th message m[n] depends only on the state value $S_{n-1}$ the state value $S_n$ can be determined when the state value $S_{n-1}$ is determined. Likewise, the state value $S_{n-1}$ depends only on the state value $S_{n-2}$. By recursively repeating this procedure, all the elements ($S_0, S_1, S_2 \ldots, S_9$) in the state sequence S can be determined. Thus, all the elements in the state sequence S depend only on the constant initially given as the initial value. Consequently, once the initial value has been identified, the state sequence S can be determined to identify all the positions of the messages distributed over the image and to extract their hidden contents.

If the initial value has been published or known to a third person despite efforts to make it secret, the third person can use the value to identify the positions of messages easily and erase the message data or write a different message data over the first data. It has been difficult for conventional methods to effectively prevent a third person from erasing the original sign to make the source unknown or writing a different sign over the original sign to act as if he or she was the author.

It is therefore an object of this invention to propose a new method for distributing and hiding message data in media data. It is another object of this invention to provide a data hiding method that prevents a third person from modifying message data.

SUMMARY OF THE INVENTION

To achieve the above objects, the present invention relates to a data hiding method of dispersively hiding the array elements of a message array in a media array based on a state value S specifying a particular array element in the media array if the media data is expressed as the media array while message data is expressed as the message array. Specifically, one aspect of the present invention comprises the steps of:

(a) determining the j-th ($j \geq 0$) state value Sj;

(b) determining (j+1)-th state value $S_{j+1}$ based on the j-th state value, the array element of the media array indicated by the j-th state value, and the array element of the message array; and (c) hiding data with respect to the array element of the media array indicated by the (j+1)-th state value $S_{j+1}$.

If the message array has J array elements, the above steps (a) to (c) are recursively repeated until the J array elements have been hidden. If j=0, the initial state value $S_0$ is determined on the basis of the data in the array elements of the message array. Specifically, an initial function for determining the initial state value $S_0$ is provided, and a value based on the data in all the elements of the message array (for example, the exclusive OR of the data) is input to this initial function.

In step (b), the (j+1)-th state value $S_{j+1}$ is determined on the basis of the exclusive OR of the j-th state value $S_j$, the data in the array element of the media array indicated by this state value, and the data in the array element of the message array. Specifically, a hiding position translation function is provided, and the above exclusive OR is input to this function to obtain the (j+1)-th state value $S_{j+1}$ as the output. The hiding position translation function may be, for example, a function using as a parameter, a secret key used in public-key cryptography. The hiding data may be the exclusive OR of the array element of the media array indicated by the j-th state value $S_j$ and the array element of the message array.

In addition, a second aspect of the present invention relates to a data extraction method of extracting a message array from a media array based on a state value specifying a particular array element in the media array if the message data is expressed as the message array and if hiding data including the message data is expressed as a hiding array while the media data in which the hiding data is dispersively hidden is expressed as the media array. This aspect of the present invention comprises the steps of:

(a) determining the j-th ($j \geq 1$) state value Sj;

(b) extracting an array elements of the hiding array from the array element of the media array indicated by the j-th state value $S_j$;

(c) determining the (j-1) state value $S_{j-1}$ based on the j state value $S_j$ and the extracted array element of the hiding array; and (d) extracting an array element of the message array based on the array element of the media array indicated by the (j-1)-th state value $S_{j-1}$ and the extracted array element of the hiding array.

The steps (a) to (c) are recursively repeated until a extraction finish condition has been met. In step (a), the state value $S_j$ used to start extraction is provided beforehand to an extractor as information required for extraction. The state value $S_j$ may be, for example, the last state value generated when the message array was hidden. In step (c), the (j-1) state value $S_{j-1}$ is determined on the basis of the exclusive OR of the j-th state value $S_j$ and the data in an array element of the hiding array. The array element of the hiding array is extracted from the array element of the media array indicated by the j-th state value $S_j$. In addition, an extraction position translation function may be provided beforehand, and in step (c), the exclusive OR of the j-th state value $S_j$ and the data in the array element of the hiding array may be input to this function to obtain the (j-1)-th state value $S_{j-1}$ as the output. The extraction position translation function may be, for example, a deciphering function using as a parameter, a secret key used in an enciphering key method. In step (b), the array element of the hiding array is be the exclusive OR of the array element of the media array indicated by the (j-1)-th state value $S_{j-1}$ the array element of the media array, and the array element of the message array.

In addition, a third aspect of the subject invention provides a data hiding method of hiding message data in media data, comprising the steps of (a) identifying one block (a pixel block in image data) in the media data in which the message data is to be hidden, (b) determining the characteristic value (for example, a pixel, brightness, or variance value) of the identified block, and (c) manipulating the characteristic value of the block so as to hide the message data by referencing a translation rule that associates the contents of the data to be hidden with the difference between a reference value for the characteristic value and the characteristic value of the block.

The reference value may be the characteristic value of another block present in the media data. If the first and second blocks are identified in the media data, these blocks are paired and the characteristic value of each pair is determined. The characteristic values obtained are compared and manipulated on the basis of the translation rule (for example, by exchanging the characteristic values) so as to hide the message data. If the message data comprises a plurality of bits, the steps (a) to (c) are repeated.

Still further, a fourth aspect of the present invention provides a data extraction method of extracting message data from media data in which the message data is hidden, comprising the steps of (a) identifying one block in the media data in which the message data is hidden, (b) determining the characteristic value of the identified block, and (c) extracting the hidden message data according to the characteristic value of the block by referencing a translation rule that associates the contents of the data to be extracted with the difference between a reference value for the characteristic value and the characteristic value of the block.

The reference value may be the characteristic value of another block present in the media data. If the first and second blocks are identified in the media data, these blocks are paired and the characteristic value of each pair is determined. Then, the hidden message data is extracted according to the characteristic value of each block by referencing the translation rule that associates the contents of data to be extracted with the difference in the characteristic values of the blocks. If the characteristic value of the first block is larger than that of the second block, this translation rule extracts one of the bits, and otherwise, extracts the other bit.

A further embodiment of the present invention relates to a system for implementing the above data extraction method. That is, the present invention further provides a data extraction system for extracting message data from media data in which the message data is hidden, comprising a translation means for translating the media data in which the message is hidden, into digital signals, the media data being transmitted as analog signals; an identification means for identifying one block in the media data in which the message data is hidden, the media data being transmitted as the output of the translation means; a characteristic value calculation means for determining the characteristic value of the block identified by the identification means; a storage means for storing a translation rule that associates the contents of data to be extracted with the difference between a reference value for the characteristic value and the characteristic value of the block; and an extraction means for extracting the hidden message data according to the characteristic value of the block.

Furthermore, the present invention also relates to a semiconductor integrated circuit with the functions of the above data extraction system provided on a single chip. That is, the present invention provides a semiconductor integrated circuit for extracting message data from media data in which the message data is hidden, comprising a means for determining a characteristic value of one block identified as the one in which the message data is hidden; and an extraction means for extracting the hidden message data according to the characteristic value of the block by referencing a translation rule that associates the contents of data to be extracted with the difference between a reference value for the characteristic value and the characteristic value of the block.

BRIEF DESCRIPTION OF THE DRAWINGS

Preferred embodiments of the present invention will now be described, by way of example only, with reference to the accompanying drawings, in which:

FIG. 17 describes hiding and extraction methods that use concentric circular arcs as positional information;

DETAILED DESCRIPTION OF THE PREFERRED EMBODIMENTS OF THE INVENTION

A. Data Definition

First, the following arrays and sequences are defined.
(1) Media array: M
(2) Message array: m
(3) State sequence: S
(4) Position sequence: p (1) Media Array M Media data includes image and sound data. Media data, in which message data is embedded, is defined with a media array M, and a media array element M[i] that is an array element of the media array are expressed as follows.

$$M: \{M_0, M_1, \ldots, M_i, \ldots, M_{I-1}\} \text{ or } M[i] \; 0 \leq i \leq I-1 \; I: \text{Length of media data} \quad \text{[Equation 3]}$$

Figure 1A:
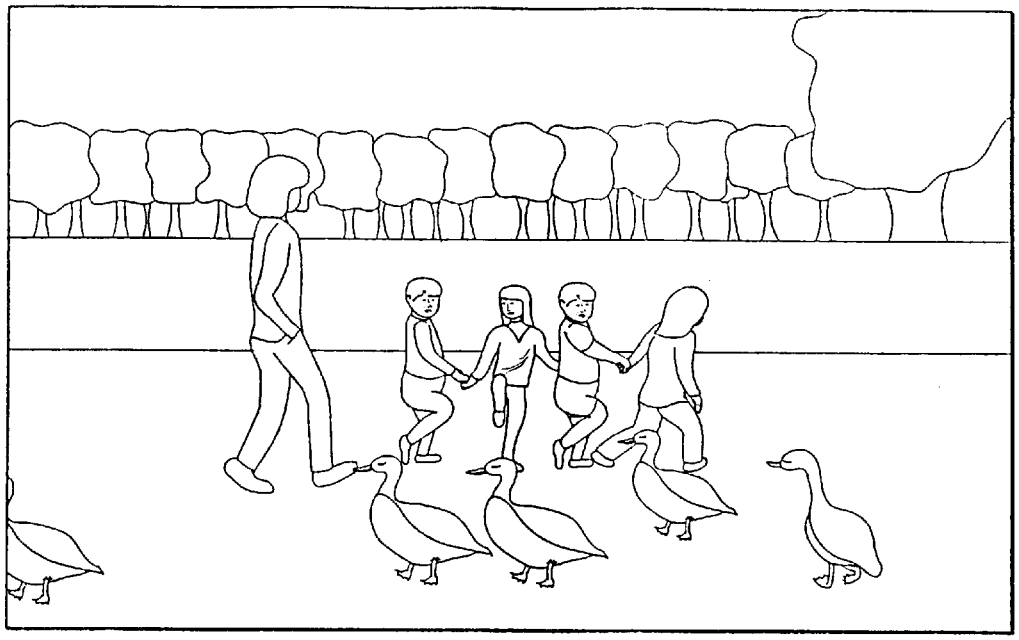
FIG. 1 is a half tone image comprising digitalized data shown on a display.
Figure 1B:
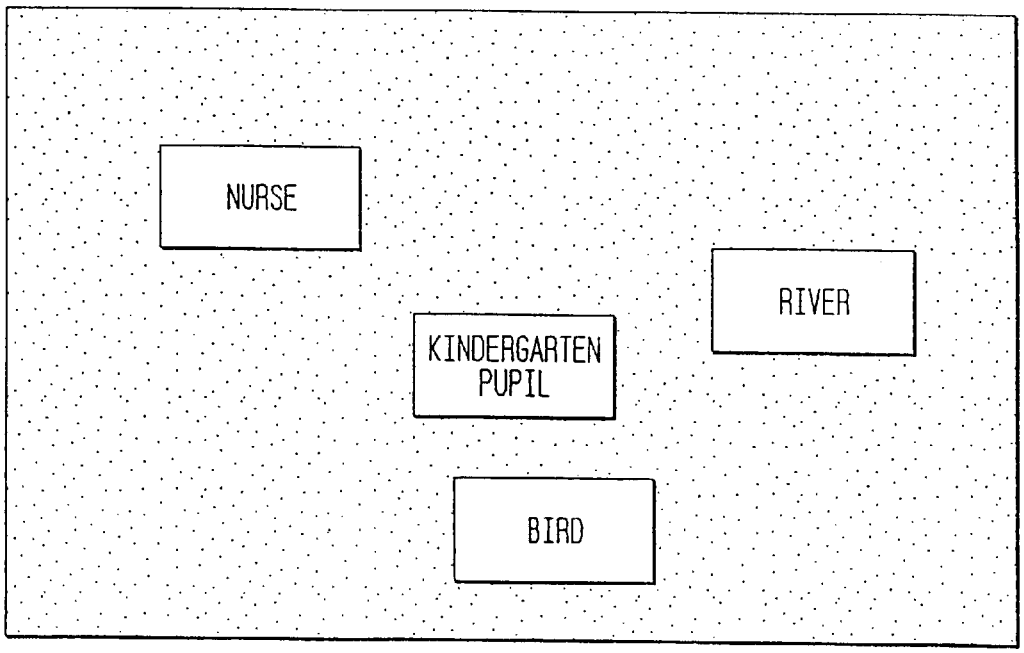
Figure 2:
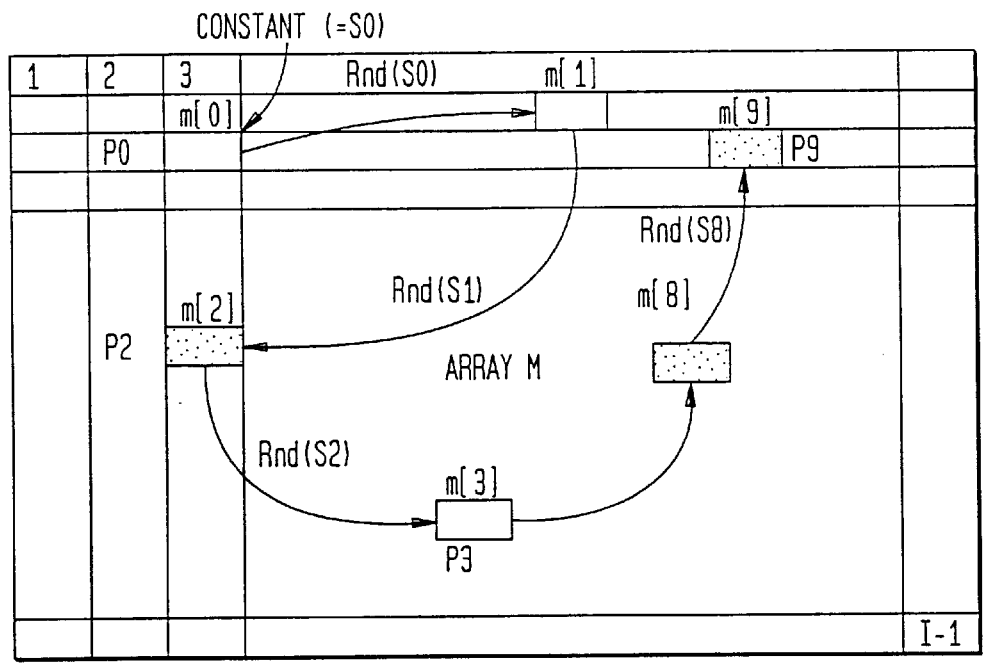
FIG. 2 schematically shows a layout of message data distributed over the image according to conventional methods.
Figure 3:
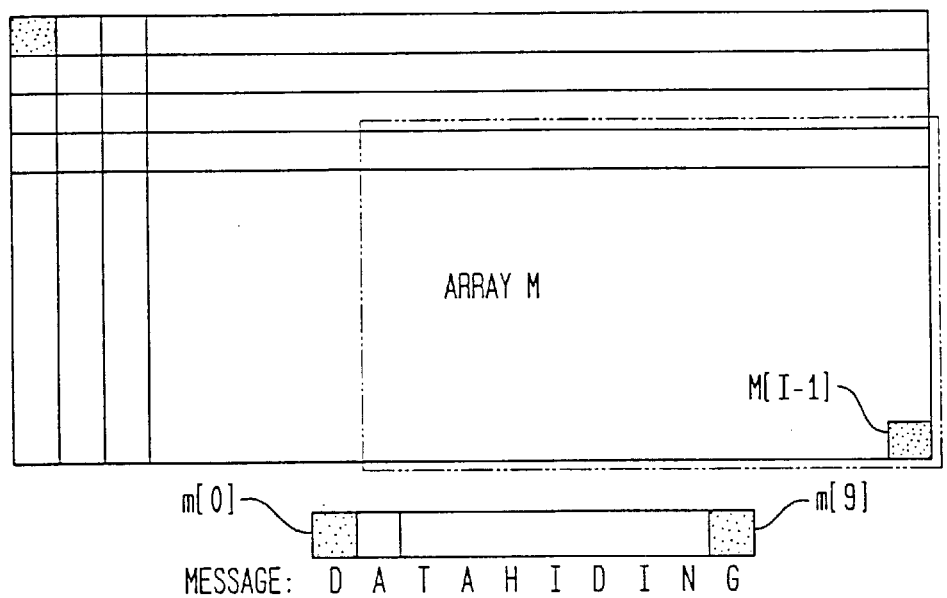
FIG. 3 describes a media array and a message array.

If the media data is, for example, an image as shown in FIG. 1(a), the image is divided into I image regions with the first one having a 0-th media array value M[0], as shown in FIG. 3(a). The i-th image region has a media array value M[i], and the last image region has a media array value M[I-1]. Each media array value has data that is the image information of the image region to which it corresponds to. The image information is a density for monochrome screens, while it is brightness for color screens. If the number of image regions is equal to the number of pixels, the media array value M[i] is the pixel value of the i-th pixel. If the image region comprises a plurality of pixels, for example, 3×3 pixels, the image information is respective pixel values. If the media data is sound, the media array value M[i] can be defined as a amplitude value at time (i). The data in each array value M[i] is assumed to be expressed as a BM byte integer.

(2) Message Array (m)

Message data to be embedded in media data includes, for example, information on the producer of the image, management information on a production number, a date, and a place, and information on permission for duplicates. Message data is defined with a message array (m) and a message array value m[j] that is an array element of the message array are expressed as follows:

$$m: \{m_0, m_1, \ldots, m_j, \ldots, m_{J-1}\} \text{ or } m[j] \; 0 \leq i \leq J-1 \; J: \text{Length of media data} \quad \text{[Equation 4]}$$

If the message data is, for example, as shown in FIG. 3(b), "DATAHIDING" comprising 10 alphanumeric characters, the j-th letter is associated with a message array value m[j-1], which thus has data indicating the corresponding letter. The data in each array value m[j] is assumed to be expressed a $B_m$ byte (1 byte for alphanumeric characters) integer. In this case, the message data has a length J of 10.

(3) State Sequence S

The state sequence S is defined to determined the locations (media array values) that are subjected to hiding, and a state value $S_j$ that is an element of the sequence are expressed as follows.

$S: \{S_0, S_1, \ldots, S_J\}$ or $S_j$ $0 \leq j \leq J$  J: Length of message data  [Equation 5]

An algorithm for generating the state sequence S is one of the important factors of this embodiment. It should be noted that the number of the elements J of the state sequence S is (J+1), which is larger than the number of the elements J of the message array (m) by one.

(4) Position Sequence (p)

The position sequence (p) is used to identify the positions that are subjected to hiding, using the following equation. A position $p_j$ that is an element of the position sequence (p) is expressed as follows.

$p: \{p_0, p_1, \ldots, p_J\}$ or $p_j$ $0 \leq j \leq J$  J: Length of message data $$p_j = S_j \bmod I \quad \text{[Equation 6]}$$

The position sequence (p) has (J+1) elements as in the state sequence S. The position $p_j$ that is an element of the position sequence is determined as the remainder of I relative to the state value with the same index value (j), that is, $S_j$. Thus, the value of the position $p_j$ is an integer between 0 and (l−1), and the image region corresponding to this value is subjected to hiding. Since (l) is an constant that is the number of image regions, the value of the position $p_j$ can be uniquely determined once the state value $S_j$ has been established. Thus, the positions that are subjected to hiding are virtually identified by the state sequence S.

B. Hiding Algorithm

The data hiding method according to this invention is closely related to an algorithm for extracting hidden data. That is, a third person who attempts to extract hidden data can view the message if he or she has specified information. In this case, it is important to effectively prevent the third person from modifying the message during extraction. In view of this point, this invention hides data based on the following three characteristics.

(1) Determination of the state value $S_0$ based on the characteristics of the message (2) Determination of the state sequence S based on the message and image data (3) Data to be hidden (1) Determination of the State Value $S_0$ Based on the Characteristics of the Message The state value $S_0$ that is the first element of the state sequence is the output of an initial function $f_{INI}$ to which the exclusive OR of all the elements (m[0], m[1], . . . , m[9]) of the message array. The state value $S_0$ and the position $p_0$ determined on the basis of this value are determined by the following equations.

$$S_0 = f_{INI}(m[0] \text{XOR } m[1] \text{XOR } m[2] \text{XOR } \ldots \text{XOR } M[n-1])$$

$$p_0 = S_0 \bmod I \quad \text{[Equation 7]}$$

Figure 4:
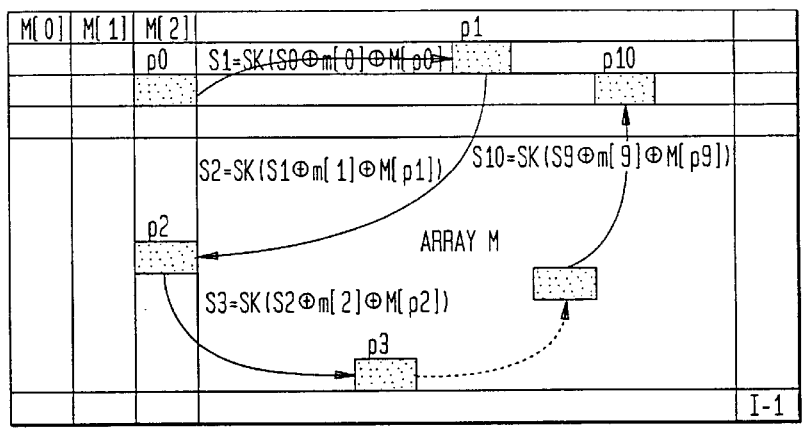
FIG. 4 schematically shows the relationship among media array values used in hiding processing.

Conventional methods have determined the initial state value $S_0$ as a particular constant regardless of the contents of the message to be embedded. According to this embodiment, however, this element is determined on the basis of the contents of the message, that is, all the message array values. FIG. 4 schematically shows the distribution of message data over an image. The initial position $p_0$ is identified from the initial state value $S_0$ as shown in the figure.

The determination of the initial state value $S_0$ from the characteristics of the message array (m) is one of the characteristics of the present algorithm. This not only makes the determination of the initial state value complicated but also effectively prevents a third person from illegally writing data over the message. The initial function $f_{INI}$ is also used as a function for determining the end of the message during extraction. This prevents a third person from writing a different message other than the original message.

(2) Determination of the State Sequence S Based on the Message and Image Data

The next state value $S_1$ is determined from the state value $S_0$. The state value $S_1$ is identified by the following equation.

$$S_1 = SK(S_0 \text{ XOR } m[0] \text{XOR } M[p_0]) \quad \text{[Equation 8]}$$

That is, the next state value $S_1$ is determined as the output of a function SK to which the exclusive OR of the current state value $S_0$, the media array value $M[p_0]$ indicated by the state value $S_0$, and the message array value m[0] is input. The media array value $M[p_0]$ is the image region at the position $p_0$ calculated from the state value $S_0$. This is true of the state value $S_2$ and subsequent state values, and this relationship can be generally expressed as the following equation.

$$S_{j+1} = SK(S_j \text{ XOR } m[j] \text{XOR } M[p_j]) \quad \text{[Equation 9]}$$

The function SK is a position translation function for determining the next state value and receives as an input, the exclusive OR of the current state value, a message array value, and a media array value. Thus, the state value is sequentially determined by recursively executing the above equation. Since (J+1) state values must be determined, the last state value is $S_J$. If the message array has 10 elements as in FIG. 3(b), 11 state values are generated. By determining the state sequence S in this manner, all the image regions that are subjected to hiding are identified. FIG. 4 shows the relationship among media array values that are subjected to hiding.

While a position sequence according to conventional techniques depends only on the initial value, the position sequence according to the present algorithm is determined by taking the message and media array values into consideration. If a third person attempts to write a different message over the original message, the overwriting is very difficult because a different state sequence is generated. This is also true if a third person attempts to modify the image data.

(3) Data to be Hidden

Figure 5:
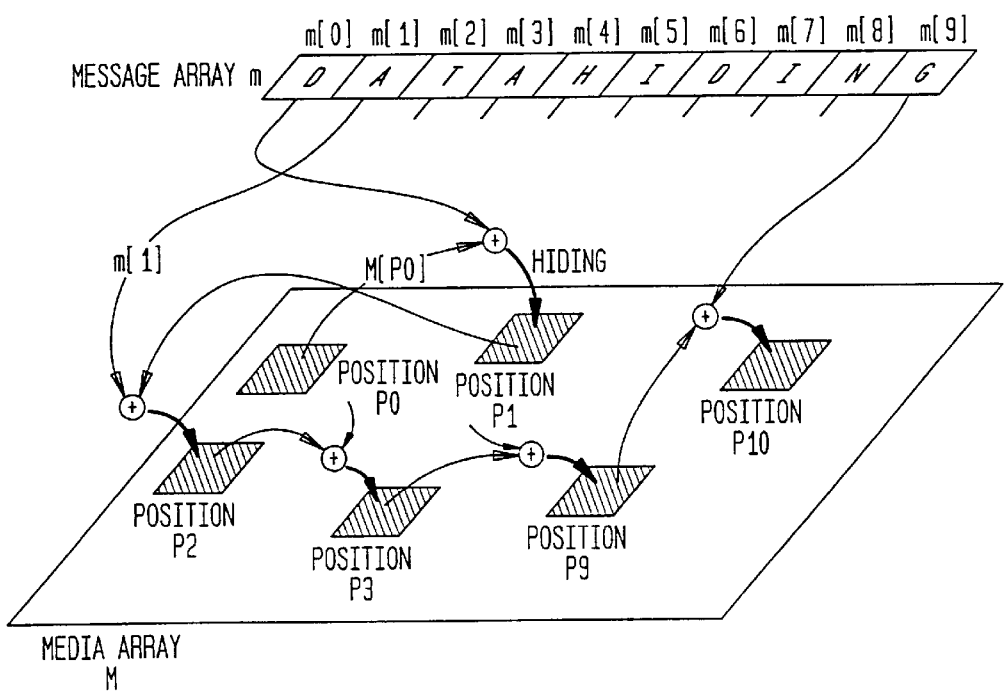
FIG. 5 is a schematic drawing describing an object to be hidden.

FIG. 5 is a schematic drawing describing an object to be hidden. The position sequence (p) that undergoes hiding is assumed to have been identified. First, data is hidden in the position $p_i$ and subsequent positions, whereas no data is hidden at the position $p_0$. Specifically, the result of the exclusive OR of the media and message array values is subjected to hiding.

First, the media array value M[0] is simply taken from the position $p_0$. Then, the exclusive OR of the message array value m[0] and the media array value M[0] obtained is determined, and the result is hidden in the position $p_1$. This hiding operation changes the contents of the media array value $M[p_1]$. Furthermore, as the processing at the position $P_2$, the exclusive OR of the message array value m[1] and the media array value M[1], the contents of which have been changed by the preceding processing is determined, and the result is hidden in the position $p_2$.

Data hiding is completed by repeating such hiding processing until the position $p_{10}$. The exclusive OR of the message array value m[9] and the media array value M[9], the contents of which have been changed by the preceding processing is hidden in the position $p_{10}$. The number of the elements of each of the state sequence S and the position sequence (p) is larger than that of the message array because no data is hidden in the position $p_0$.

According to the present algorithm, if hidden message is extracted, the extraction is recursively executed in the reverse order starting with the last message array value m[9]. The hiding of the results of the exclusive OR of the message and media arrays according to the present algorithm is closely related to the message extraction procedure. The details are described in the "Message data extraction" section. In addition, various algorithms for actually hiding data are conceivable. In a second embodiment, PBC (Pixel Block Coding) is explained as an example of an algorithm for hiding data.

C. First Embodiment

Figure 6:
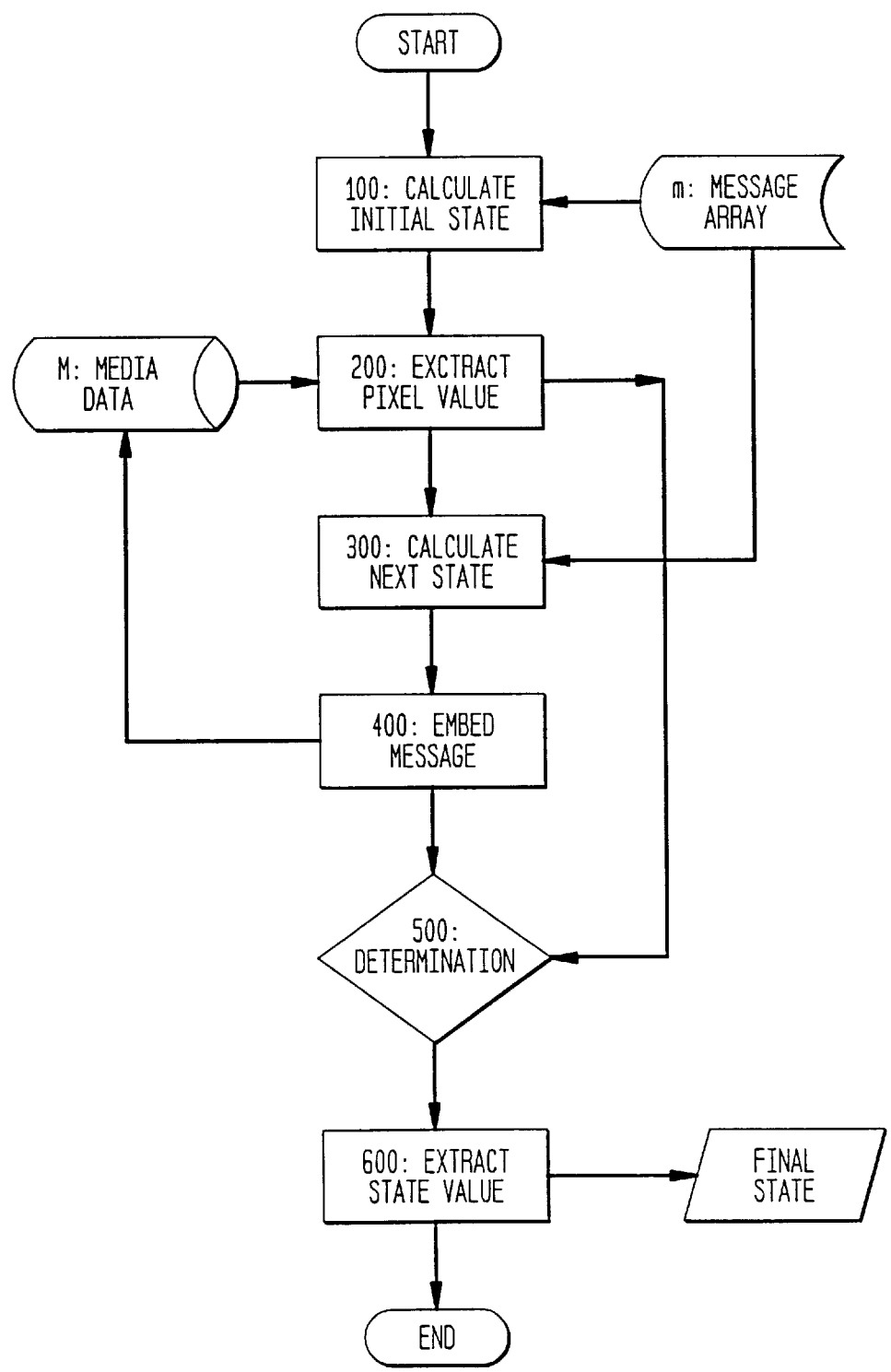
FIG. 6 is a flowchart showing a procedure for hiding message data in media data.

A first embodiment is specifically described in conjunction with the procedure in FIG. 6. FIG. 6 is a flowchart showing a procedure for hiding message data in media data. In the following description, reference FIGS. 4 or 5 as appropriate.

Calculation of the Initial State Value (Step 100)

To hide data, the position sequence (p) must be determined. To do this, the initial position p[0] is first determined. The initial position p[0] is determined as the output of the initial function $f_{INI}$ using the initial state value $S_0$ as an input, and the variable $S_0$ is determined by the following equation.

$$S_0 = f_{INI}(m[0], m[1], m[2], \ldots, M[J-1]) = H1(m[0]//m[1]//m[2]// \ldots //M[J-1])$$ [Equation 10]

In the above equation, H1 is a hash function. In addition, the operator "//" means that the elements of the message array are connected together. The specific operation may be, for example, the exclusive OR of the data in the array elements. If, however, the exclusive OR is used, the order of the message array values is not reflected in the results of calculation. That is, the "DATAHIDING" in FIG. 3(b) has the same value as "TADAHIDING". Then, for example, the method called CRC (Cyclic Redundancy Check) can be used to reflect the order relationship. This algorithm is one of the algorithms for calculating check sums, and generates outputs that depend on the contents and order of the data array.

From an input with a byte length of $B_m$ bytes (the array value m[i]), the hash function H1 generates an output with a different byte length K (a hashed value). Since this is a one-way function, it is virtually impossible to estimate (x) from (y) when H(x)=y.

This K byte hashed value is used as the initial state value $S_0$ for data hiding. The hashed value is simply used as an initial value for data hiding, so it must only be ensured that different outputs results from different inputs. Thus, the hashed value has no particular meaning. Importantly, the operation results in the output of a value indicating the characteristics of the array, that is, the hashed value is uniquely determined on the basis of the contents of all the array elements and may depend on the contents of the overall array.

If the message data is the "DATAHIDING" shown in FIG. 3(b), the output of the hash function H1 from the exclusive OR of the data indicating all the alphanumeric characters (the data in the array value m[i]) is the state value $S_0$. The remainder if I (the number of image regions) relative to the state value $S_0$ is the position $p_0$. This allows the state value $S_0$ and the position $p_0$ to be obtained as the initial state values.

Pixel Value Extraction (Step 200)

The image information in the image region corresponding to the value of the position $p_0$ obtained in step 100 is determined. If, for example, $p_0=i$, this is the media array value M[i]. This data is expressed as an $B_m$ byte integer.

Next Station Calculation (Step 300)

In addition to the state value $S_0$ determined in step 100, the next state value $S_1$ is determined from the media array value M[$p_0$] and the media array value m[0] identified from the state value $S_0$. The state value S1 can be determined by the following equation.

$$S_1 = SK(S_0 \text{ XOR } m[0] \text{ XOR } M[p_0])$$ [Equation 11]

(XOR is an exclusive OR operation)

That is, the exclusive OR of the state value $S_0$, the message array value m[0] and the media array value M[$p_0$] is determined, and the result is input to the function SK. Then, the output of the function SK is the state value $S_1$. This function SK is called a position translation function, and a position translation function SK for hiding message data in media data is particularly called a hiding position translation function. Since the position translation function SK is closely related to an extraction position translation function PK for extracting hidden data, it is also described in detail in the following description of the extraction position translation function.

The state value $S_2$ and subsequent state values can be determined by executing a similar procedure. To generalize this, the j-th state value $S_j$ and position $p_j$ can be expressed by the following equations.

$$S_j = SK(S_{j-1} \text{ XOR } m[j-1] \text{ XOR } M[p_{j-1}])$$

$$p_j = S_j \bmod I$$ [Equation 12]

(SK: hiding position translation function)

It should be again noted that the position $p_j$ depends on the contents of the message and media data as well as the preceding state value $S_{j-1}$.

The state value $S_{j-1}$, message array value m[j-1], and media array value M[$p_{j-1}$] used as inputs to the hiding position translation function SK have different byte lengths: K, $B_m$, and $B_M$ bytes, respective. It is of course possible to calculate the exclusive OR of inputs with different byte lengths, but the exclusive OR is preferably calculated after converting the inputs so that they has the same byte length. The following two hash functions H2 and H3 are used to convert the inputs so that all of them have a length of K bytes as in the state value.

H2: a hash function for generating a K byte hashed value from a $B_m$ byte integer H3: a hash function for generating a $B_m$ byte hashed value from a $B_M$ byte integer That is, the hash function H2 is used for the message array value m[j-1] to generate a K byte hashed value from the $B_m$ byte integer in the array value. In addition, the hash function H3 is used for the media array value M[$p_{j-1}$] to translate the integer with a bit length of $B_M$ bytes into a $B_m$ byte integer. The hash function H2 is further used to generate a K byte hashed value. Equation 7 described above includes the case in which inputs have been converted by the hash functions in this manner.

Message Embedding (Step 400)

The exclusive OR of the message array value m[j-1] and the media array value M[$p_{j-1}$] is determined and the data obtained is the hiding array value Mm[j-1]. The data in the hiding array value Mm[j-1] is hidden in the position $p_j$ determined in step 300. The hiding array value Mm[j-1] is an array element of the hiding array Mm.

$$Mm: \{Mm[0], Mm[1], \ldots, Mm[j], \ldots, Mm[J-1]\}$$

$$Mm[j] = m[j] \text{ XOR } M[p_j]$$ [Equation 13]

It should be appreciated that the hidden data is not the message array value m[j] but the hiding array value Mm[j] generated from the exclusive OR of the message array value m[j] and the media array value M[$p_j$]. The hiding array value Mm[j−1] is hidden in the position $p_j$ by the function X. This changes the data in the media array value M[$p_j$]. The media array value M[$p_j$] the contents of which have been changed is called M'[$p_j$]. For the specific contents of the function X, that is, the algorithm for hiding the hiding array in its specified position, PBC is described in the second embodiment as one example.

Determination (Step 500)

It is determined whether the value of (j) is equal to J (a value larger than the number of the elements in the message array by one). If j=J, all the message array values have been hidden. If (j) is smaller than J, 1 is added to (j) and the process returns to step 200. Steps 200 to 400 are then recursively executed until (j) becomes equal to J. This procedure enables a state sequence S and a position sequences each including (J+1) elements to be obtained.

State sequence $S$: $\{S_0, S_1, S_2, \ldots, S_J\}$

Position sequence $P$: $\{p_0, p_1, p_2, \ldots, p_J\}$ [Equation 14]

Due to the hiding of the data, the elements of the media array M are changed as follows.
(Media array prior to hiding)

$M: \{M[0], \ldots, M[p_0], \ldots, M[p_1], \ldots, M[p_{J-1}]\}$ (Media array after hiding)

$M': \{M'[0], \ldots, M'[p_0], \ldots, M'[p_1], \ldots, M'[p_{J-1}]\}=\{M[0], \ldots, M[p_0], \ldots, M[p_1], \ldots, M[p_{J-1}]\}$ [Equation 15]

M' means the media array after hiding, and M'[i] means that the contents of the media array value prior to hiding have changed. That is, the media array value M' means that only the contents of the J array elements of the original message array M which are identified by the state sequence S have changed. Since the array element M[$p_0$] corresponding to the state value $S_0$ is subjected to no change in data, M'[$p_0$] is equal to M[$p_0$].

Figure 7:
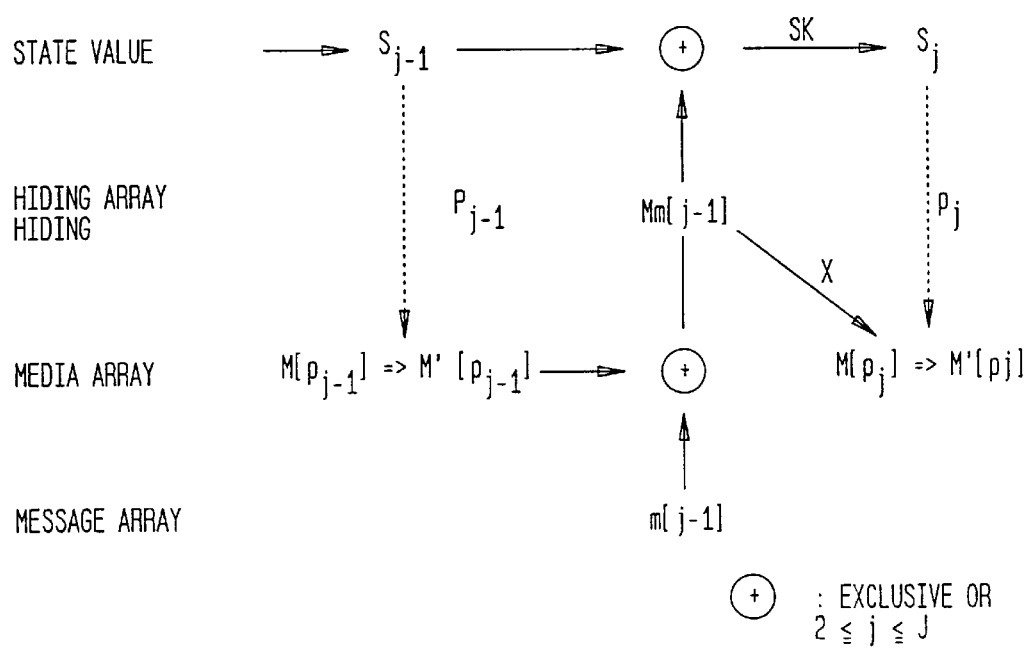
FIG. 7 shows the relationship between a state value $S_{j-1}$ and a state value $S_j$ in hiding.

FIG. 7 shows the relationship between the state value $S_{j-1}$ and $S_j$ in hiding. The state value $S_j$ can be determined by calculating the exclusive OR of the state value $S_{j-1}$ and the hiding array Mm[j−1] (M'[$p_{j-1}$] XOR m[j−1]) and inputting the result to the position translation function SK. The media array value M'[$p_{j-1}$] has already had its contents changed during the hiding of the preceding state. In addition, the hiding array Mm[$p_{j-1}$] is hidden in the position $p_j$ by the function X. This changes the data in that position M[$p_j$].

State Value Extraction (Step 600)

The hiding of the message is finished by extracting the following two pieces of information.

(1) Media array M' after hiding (2) Final state value $S_J$

The media array M' is finally obtained by hiding the data in the media data at step 400. The final state value $S_J$ is the J-th state value that is calculated last. These information are required when extracting the message data as described below. When extracting the hidden message, the extractor does not need to know the state values S0 to SJ−1 prior to (J−1)-th so long as he or she knows only the J-th state value. This is because these state values can be identified by inversely converting the final state value. Of course, the extractor must have required information described below.
(Message Data Extraction)

The following three pieces of information are provided to a third person to extract message data.

(1) Media array M' after hiding (2) Final state value $S_J$ (3) Extraction position translation function PK Information (1) and information (2) are finally generated during the embedding of the message data. The extraction position translation function PK in the information (3) is described in conjunction with the hiding position translation function.

a. Hiding Position Translation Function SK, Extraction Position Translation Function PK As the hiding position translation function SK for generating the next state value has been defined in hiding the message, the extraction position translation function PK for generating the preceding state value is defined in extracting the message. The hiding and extraction position translation functions SK and PK are reverse to each other as shown in the following equations.

$PK(SK(x))=$ i x $SK(PK(x))=x$ [Equation 16]

Thus, the initial message array (m) can be extracted by using the hiding position translation function SK to convert the message array (m) and then using the inverse function PK to further convert the result.

Various functions that meet the above equations are conceivable. To virtually prevent a third person from reproducing the hiding position translation function SK using the provided extraction position translation function PK, an enciphering function and a deciphering function in a public enciphering method are preferably used. There are several algorithms according to the public key method, and any of them may be used. By way of example, the typical RSA method is explained. The algorithm of the RSA method is as follows.

1. Two large prime numbers P, Q are selected and calculate n=p*q.
2. Calculate r=1 cm(p−1, q−1) and select (d) such that gcd(d, r)=1.
3. Determine (e) such that e*d=1(mod r) and 0<e<r.
4. Publish (e) as a public key and also publish (n). Make (d) secret as a secret key.
5. To encipher a message (m), calculate (c) such that $m^e$=c(mod n). This (c) becomes the encrypted message.
6. To decipher an enciphered message, calculate (m) such that $c^d$=m(mod n). This (m) is the deciphered message.

By applying this algorithm to this embodiment, the following hiding and extraction functions SK and PK are obtained.

$SK(m)=x^d(mod\ n)$ $PK(m)=x^e(mod\ n)$ [Equation 17]

That is, a publisher who has produced the image has a secret key (d) and uses it to obtain the hiding function SK. The function SK is used to generate the position state sequence S for embedding the message data and embeds the data in the media data. A third person, who has obtained this distributed data, uses the public key (e) to obtain the extraction function PK. The third person uses the function PK to generate the position state sequence S in order to read the message. In the public key method, the public key is published to third people but only the author who has produced the image has the secret key, so the third people cannot know the contents of the image. Thus, they cannot know the contents of the hiding position translation function. Since the calculation of the secret key from the public key requires an enormous amount of calculations, it is almost impossible for a third person to know the hiding position translation function SK. This method can effectively prevent a third person from modifying the original data.

The important nature of exclusive ORs required to explain the message extraction procedure is described in brief. Exclusive OR operations have the following nature. When the exclusive OR of A and B is determined and the exclusive OR of this result and B is then determined, A is reproduced.

$$(A \text{ XOR } B) \text{ XOR } B = A \qquad \text{[Equation 18]}$$

(Extraction Algorithm)

Figure 8:
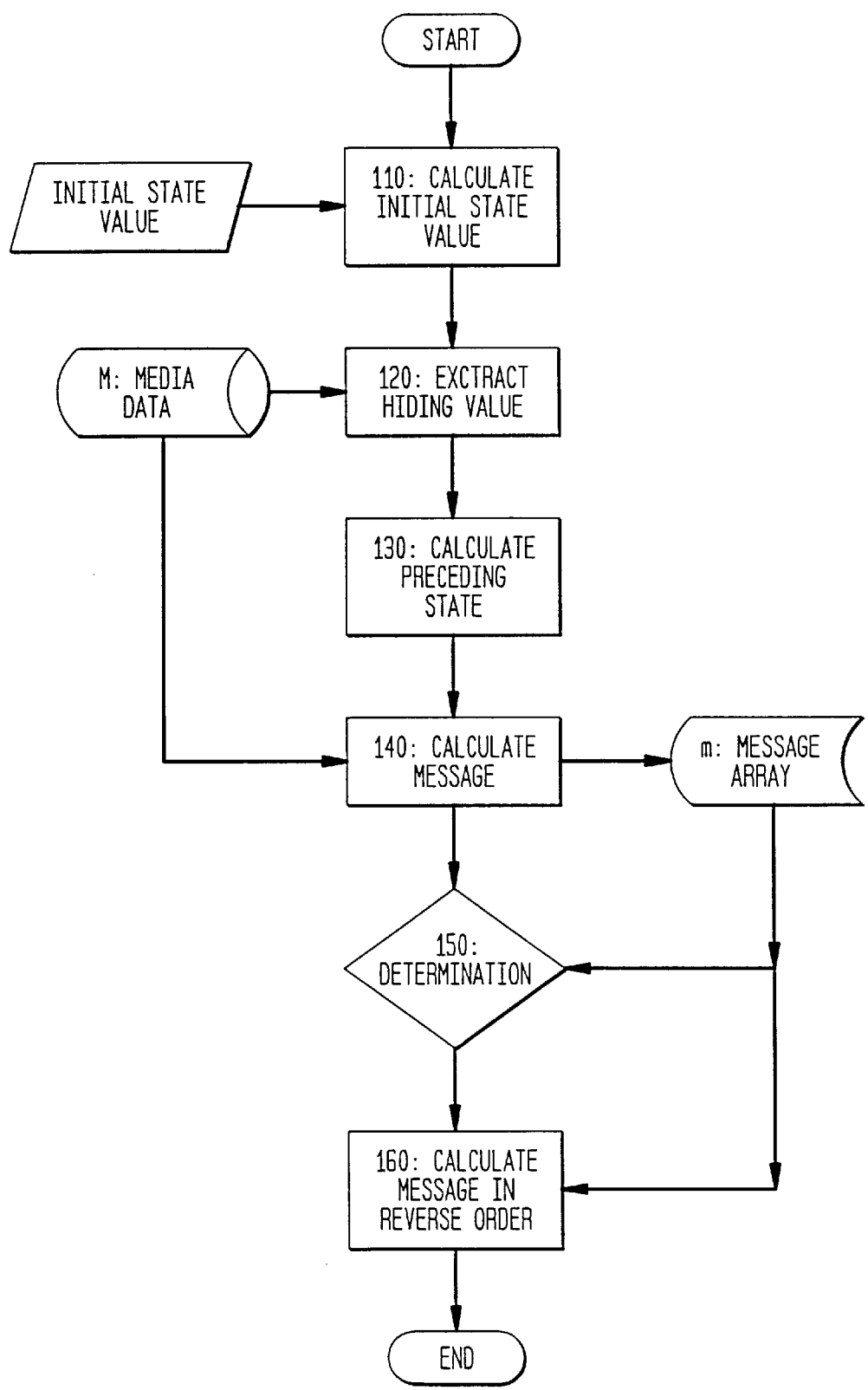
FIG. 8 is a flowchart showing a procedure for extracting message data from hidden data.

FIG. 8 is a flowchart showing a procedure for extracting embedded message data.

Initial State Value Calculation (Step 110)

First, the position $p_J$ in which the message array value m[J−1] is hidden is determined from the final state value $S_J$ that has been provided to the extractor, according to the following equation.

$$p_J = S_J \bmod I \qquad \text{[Equation 19]}$$

Hiding Value Extraction (Step 120)

The media array M'[$p_J$] has the hiding array value Mm[J−1] hidden in the original image information in the position $p_J$. The array Mm[J−1] has been determined as the exclusive OR of the media array value M'[$p_{J-1}$] and the message value array m[J−1]. A function X' is then defined to extract the hiding array value Mm[J−1] from the media array value M'[$p_J$]. An example of the specific contents of the function X' in the following equation is described in the second embodiment.

$$Mm[J-1] = \text{function } X'(M'[p_J]) \qquad \text{[Equation 20]}$$

Preceding State Calculation (Step 130)

Next, the preceding state value $S_{J-1}$ is determined by calculating the exclusive OR of the state value $S_J$ and the hiding array value Mm[J−1] determined from the function X'. It should be noted that the mathematical nature of the above exclusive OR is used in this case.

$$PK(S_J) \text{ XOR } X'(M'[p_J]) = (S_{J-1} \text{ XOR } Mm[J-1]) \text{ XOR } Mm[J-1] = S_{J-1} \qquad \text{[Equation 21]}$$

That is, since the extraction position translation function PK is reverse to the hiding position translation function, it can be used to reproduce from the state value $S_J$, the result of the exclusive OR of the state value $S_{J-1}$ and the hiding array value Mm[J−1]. The exclusive OR of this result and the hiding array value Mm[J−1] determined in step 120 can be determined to identify the preceding state value $S_{J-1}$.

Message Calculation (Step 140)

Once the state $S_{J-1}$ has been determined, the corresponding media array value M'[$p_{J-1}$] can be identified. The message array value m[J−1] can then be extracted using the following equation. If the message in FIG. 3(b) has been hidden, this step allows the trailing letter "G" to be extracted.

$$i \ M'[p_{J-1}] \text{ XOR } Mm[J-1] = M'[p_{J-1}] \text{ XOR}(M'[p_{J-1}] \text{ XOR } m[J-1]) = m[J-1] \qquad \text{[Equation 22]}$$

The extraction of state or message array values can be generally expressed as follows using the index value (j) (1≦j≦J).

$S_{j-1}$:

$$PK(S_j) \text{ XOR } X'(M'[p_j]) = (S_{j-1} \text{ XOR } Mm[j-1]) \text{ XOR } Mm[j-1] = S_{j-1}$$

m[j−1]:

$$M'[p_{j-1}] \text{ XOR } Mm[j-1]) = M'[p_{j-1}] \text{ XOR}(M'[p_{j-1}] \text{ XOR } m[j-1]) = m[j-1] \qquad \text{[Equation 23]}$$

Figure 9:
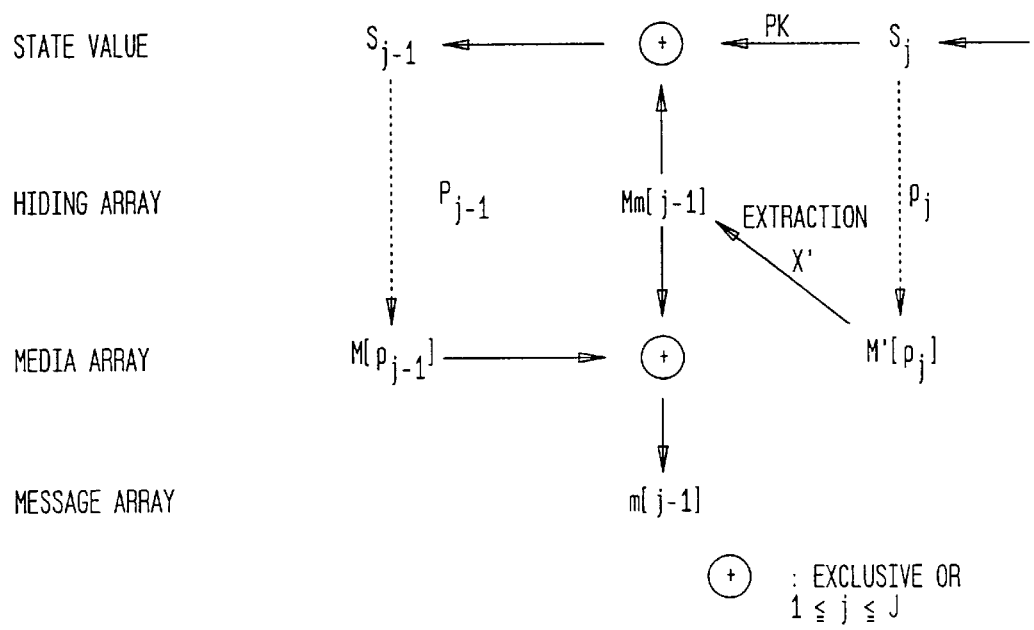
FIG. 9 shows the relationship between a state value $S_j$ and a state value $S_{j-1}$ in extraction.

FIG. 9 shows the data relationship indicated by the above equations. This figure shows the relationship between the state value $S_j$ and the state value $S_{j-1}$ in extraction. A comparison of this figure with FIG. 7 shows that the extraction procedure is reverse to the hiding procedure.

Determination (Step 150)

Each time the message array value m[j] is generated, it is determined whether it is the beginning of the message array. If so, all the elements of the message array (m) have been extracted. Since the message array (m) is extracted in the reverse order starting with the last element, the message is extracted in the order of "GNIDIHATAD" in the example of FIG. 3(b). At step 160, the order of the message is reversed to generate a complete message. If the message array value m[j] is not the beginning of the message array, steps 120 to 140 are recursively executed until the result of the determination at step 140 becomes positive.

The determination of whether or not an element of the message array (m) is the beginning is equal to the determination of whether the generated state value $S_j$ matches the output of the hash function H1. The exclusive ORs of all the elements of the message array (m) which have already been generated are input to the hash function H1. If the state value $S_j$, which has been generated in the reverse order, and the output of the hash function H1 has the relationship shown in the following equation, the value of j is zero (see Equation 10).

$$S_j = f(m[J-1] \text{ XOR } m[J-2] \text{ XOR } \ldots \text{ XOR } m[j]) = S_0 \qquad \text{[Equation 24]}$$

Figure 10:
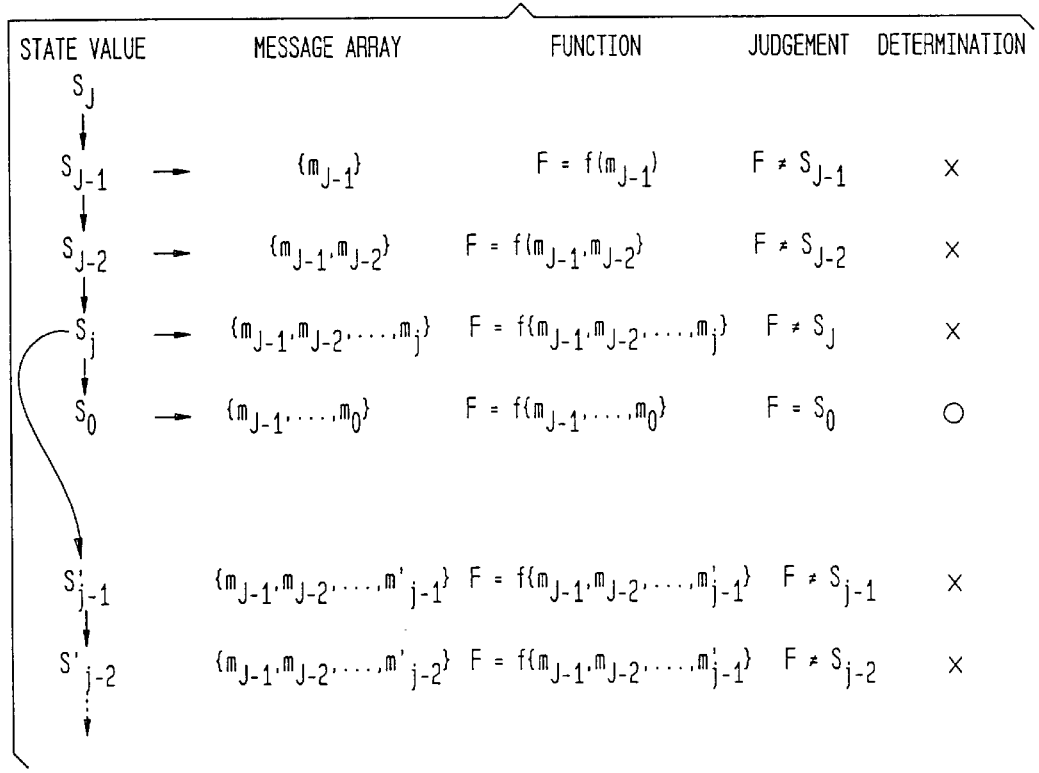
FIG. 10 describes the determination of whether a generated message array value is the beginning of the message.

The above equation is established only when j=0 and not in the other cases (j≠0). Each time the final state value $S_j$ is generated in the reverse order, it is compared to the output of the hash function based on all the extracted message array values. FIG. 10 describes the determination of whether the generated message array value is the beginning of the message. First, the state value $S_{J-1}$ preceding the final state value $S_J$ is determined and the message array value $m_{J-1}$ is determined. The output F of the initial function (f) obtained when the message array value $m_{j-1}$, has been input does not match the state value $S_{J-1}$. If the state value $S_0$ is determined, it matches the output F of the initial function and the message array values is determined to be the beginning. Thus, due to the following characteristics, the present algorithm s very useful in preventing a third person from modifying the message.

(1) Prevention of the Overwriting of a Different Message

According to conventional techniques, the generated position sequence S has depended only on an initially provided constant regardless of the contents of the message. By simply knowing the constant, third people have been able to erase the message or overwrite a different message over an original message. According to the present algorithm, however, the generation of the state sequence also depends on the contents of the message, different messages result in different position sequences. Since the hidden position is based on the position sequence, a different message with different contents cannot be hidden in a position at which the original message is present. This is also true of media data.

(2) Prevention of the Hiding of a Different Message

The present algorithm checks the condition shown in Equation 24 to determine the end of extraction. This condition is met only when the contents of an extracted message are the same as those of the original message and when the extracted message has the same length as the message data (J). Extraction is not finished unless this requirement is met. Thus, if an attempt is made to hide data other than the original message in the reverse order based on the final state value $S_f$, the requirement in Equation 24 is never met and the calculation continues permanently. Consequently, attempts to hide a message in positions other than those in which the original message is present fail because the calculation is not finished.

Figure 11:
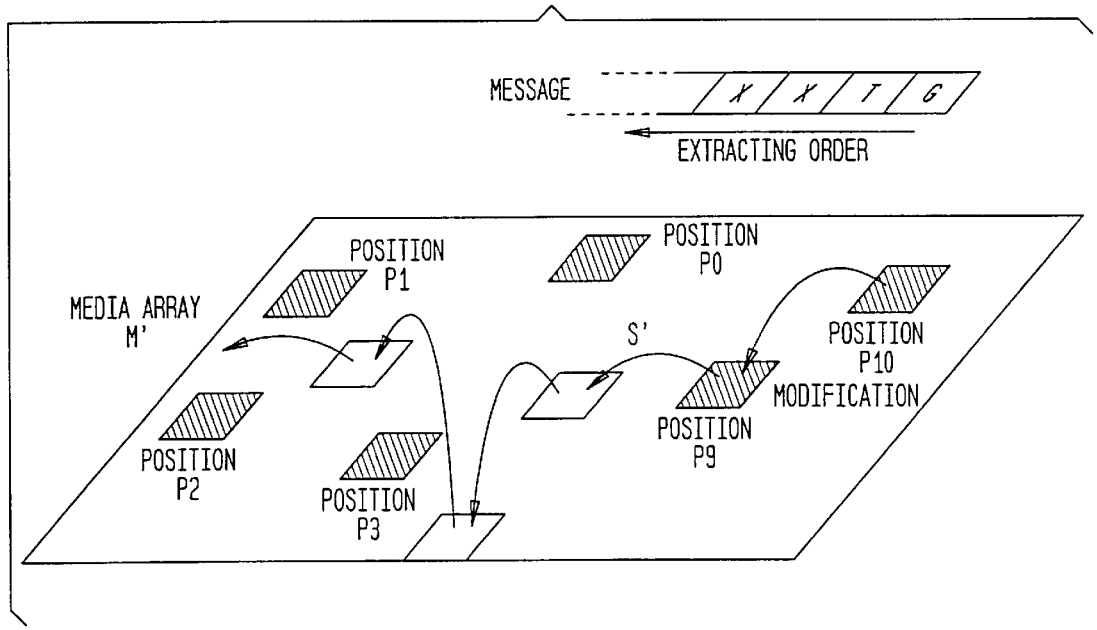
FIG. 11 is a conceptual drawing showing a state in which an incorrect state sequence S has been generated due to modification.

If a third person has modified the message array values as shown in FIGS. 10 and 11, a different state array S' is generated on the basis of the modified message. This prevents the third person from erasing or overwriting the original message located in positions other than those positions identified by the state sequence S'. The state sequence S' generated by modification as shown in FIG. 11 never allows the determination that extraction has been finished. Since the writing of different messages can be virtually prevented, modification by third people can be effectively prevented.

D. Second Embodiment

This section describes Pixel Block Coding (hereafter referred to as "PBC") that is one of the methods of embedding in media data to be hidden and extracting the hidden data. With PBC, data hiding and extraction can be processed according to the translation rule described below.

(Basic Algorithm)

The primary characteristics of the pixel values of two adjacent pixels generally have a high correlation. Thus, even if the pixel values are exchanged between adjacent pixels, the image will not be visibly degraded. In view of this nature, the present algorithm defines an image region with at least one pixel as a pixel block, and hides one bit data by intentionally exchanging the characteristic values of adjacent pixel blocks based on a particular translation rule. That is, data is expressed by exchanging the characteristic values of adjacent pixel blocks. In addition, data is extracted according to an extraction rule determined by this translation rule.

Bit information is expressed by exchanging the characteristic values (for example, brightness) of two adjacent pixel blocks according to the following translation rule.

Bit on <1>: the characteristic value of one pixel block ($PB_1$) is larger than the characteristic value of the other pixel block ($PB_2$)

Bit off <0>: the characteristic value of one pixel block ($PB_1$) is smaller than the characteristic value of the other pixel block ($PB_2$)

In addition, bit information is extracted by comparing the characteristic values (for example, brightness) of two adjacent pixel blocks according to the following extraction rule.

The characteristic value of one pixel block ($PB_1$) is larger than the characteristic value of the other pixel block ($PB_2$):bit on <1>

The characteristic value of one pixel block ($PB_1$) is smaller than the characteristic value of the other pixel block ($PB_2$):bit off <0>

Figure 12A:
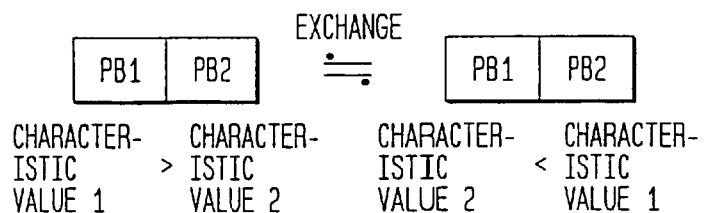
FIG. 12 describes data hiding and extraction methods using PBC.

FIG. 12 describes data hiding and extraction using PBC. The pixel blocks PB1 and PB2 may be defined as a set of a plurality of pixels, for example, 3×3 pixels or one pixel may be defined as a one pixel block. Since adjacent pixel blocks have a high correlation, the exchange of their positions does not visually degrade the image (FIG. 12a).

Figure 12B:
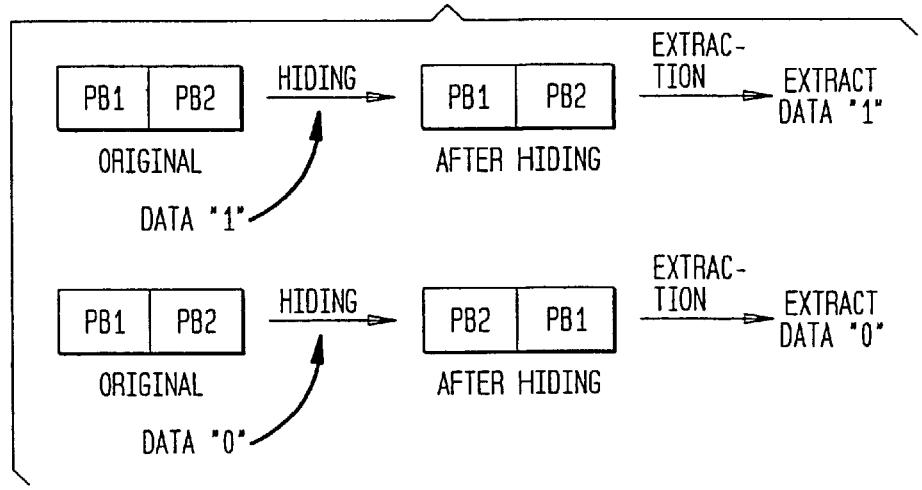

The positions of the pixel blocks in the original image are assumed to be as shown in FIG. 12(b). It is also assumed that as the result of a comparison of the characteristic values of two pixel blocks, the characteristic value of $PB_1$ is larger than that of $PB_2$. If data "1" is hidden in the original, the characteristic values of the pixel blocks have already met the condition for the data "1" in the translation rule and are thus not exchanged. When the data is extracted, the data "1" is extracted because the extraction rule specifies that this be done if the characteristic value of PB1 is larger.

On the other hand, if data "0" is hidden in the original, the characteristic values of the pixel blocks of the original are exchanged because the relationship between these characteristic values does not meet the condition for the data "0". This exchange, however, cannot be visually recognized. During extraction, the data "0" is extracted on the basis of the relationship between the characteristic values of these pixel blocks.

In this manner, PBC selects from the image a sufficient number of pixel blocks to hide information to be hidden. One of the selected pixel blocks and the adjacent pixel block are then paired to generate an array of such pairs. The pairs are sequentially hidden starting with the beginning of the array.

This array may be associated with the state sequence S in the first embodiment. For example, a pixel block is associated with the array element (m) of the media array M in the first embodiment. Each array element (state value $S_j$) sequentially generated during hiding and the adjacent media array value are paired. Pairs obtained are then subjected to the above processing. It is also possible to make such determinations based on a pseudo random number sequence generated from particular seeds of random numbers.

During extraction, the same block array as in hiding is scanned. The overall image is extracted by collecting one bit after another according to the extraction rule by determining whether each pair represents "bit on" or "bit off". If the characteristic values of the paired pixel blocks are the same, this pair is skipped as in hiding. By making the block array or the array generation method secret, the hidden information can be hidden from third people.

In PBC, the embedding positions are preferably determined in view of image quality and extraction accuracy. That is, if the difference in the characteristic value between the paired pixel blocks is too large, image quality may be degraded by the exchange operation. To restrain such degradation of image quality, a first threshold (an upper limit) is preferably provided such that if the difference in the characteristic value is equal to or larger than the threshold, no bit is embedded in that pair.

In addition, if the difference in the characteristic value is sufficiently small, image quality is not substantially degraded by the exchange operation. In this case, however, noise may reverse the magnitude of the characteristic values, thereby preventing the embedded bit from being extracted. Thus, to restrain such a decrease in extraction accuracy, a second threshold (a lower limit) is preferably provided such that if the difference in the characteristic value is equal to or smaller than the threshold, no bit is embedded in that pair.

Those pairs which correspond to these cases are skipped without being subjected to operations. The bit information to be hidden is then passed to the next pair.

(Block Characteristic Values)

The values of the primary and secondary characteristics of pixel blocks can be used as the characteristic values. The primary characteristics are direct pixel value parameters such as the brightness and chromaticity of pixel blocks. The secondary characteristics are those values such as the mean and variance of the above parameters which indicate statistical natures, and can be obtained by analyzing the primary characteristics. Furthermore, the characteristic value may be the result of an operation with an array comprising a plurality of pixel values and a specified array (mask) or a specified element value obtained by frequency conversion. The primary characteristics exhibit a high correlation between two adjacent pixel blocks. The secondary characteristics, however, exhibit a high correlation between two separated blocks that are not adjacent to each other. It should thus be noted that pixel blocks that are subjected to PBC are not necessarily limited to adjacent blocks. The brightness value that is a primary characteristic and the variance value that is a secondary characteristic are described below as examples of the characteristic value of pixel blocks.

Figure 13:
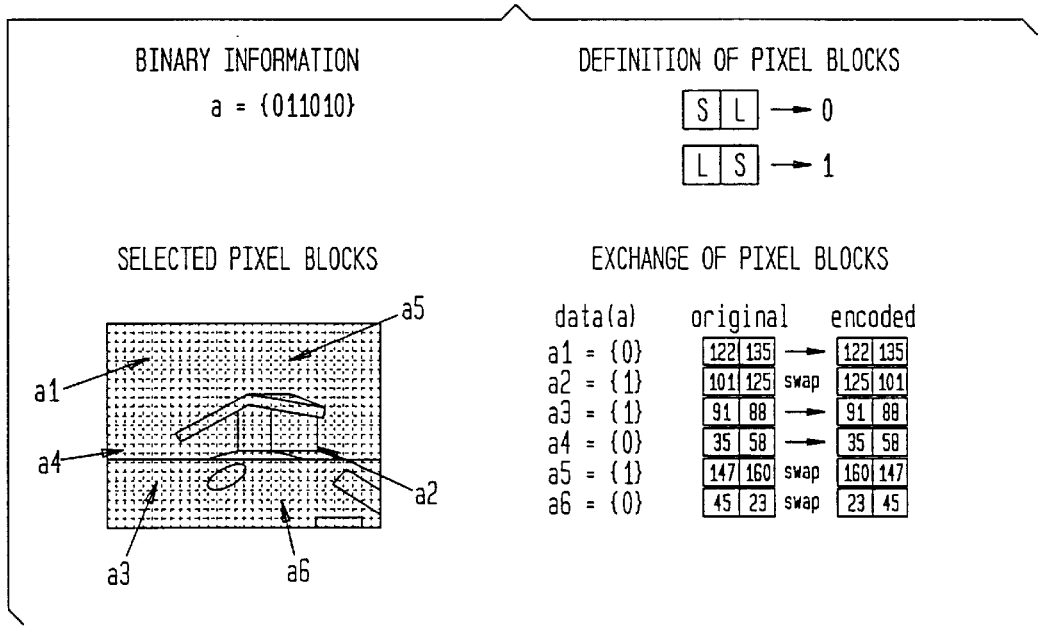
FIG. 13 describes a hiding method with PCB using a single pixel as a pixel block.

First, the use of the brightness value as the characteristic value of pixel blocks is described. If a single pixel is associated with a pixel block, the brightness value of this pixel can be directly used as the characteristic value of this block. In natural images, adjacent pixels often have a high correlation, so image quality is not substantially degraded even if they are exchanged. FIG. 13 describes hiding with PCB executed when a pixel block comprises a single pixel.

Next, the use of the variance value as the characteristic value is described. When a pixel block comprises n×m pixels, image quality may be significantly degraded, for example, a striped pattern may occur on the image if the brightness values of pixels are exchanged between blocks. Thus, it is not preferable to directly use the pixel value as the characteristic value of blocks. Consequently, the use of the variance value of pixel brightness as the characteristic value is contemplated.

It is known that when the nature of the brightness value of a pixel block is divided into a mean value (h) and a variance value (d), image quality is not substantially degraded if the variance values (d) are exchanged between adjacent pixel blocks with the mean values (h) remaining unchanged. Thus, based on this nature, the data can be hidden by using the variance value (d) as the characteristic value of pixel blocks and exchanging these values between adjacent blocks according to the translation rule.

Figure 12C:
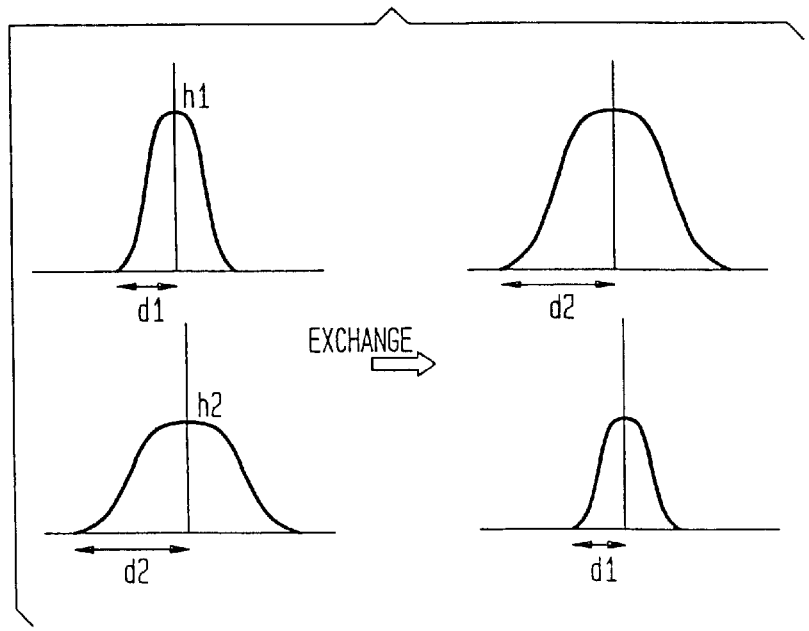

It is assumed that the pixel block $PB_1$ has a mean value $h_1$ and a variance value $d_1$ while the pixel block $PB_2$ is assumed to have a mean value $h_2$ and a variance value $d_2$, as shown in FIG. 12(c). If the bit "1" is hidden, the condition for this bit is not met because $d_1 < d_2$. Then, only the variance values (d) are exchanged between the two pixel blocks. This is equal to the exchange of the crests of the distributions between the two pixel blocks with their mean values (h) remaining unchanged.

(Amount of Information that can be Hidden)

In PBC, the upper limit of the amount of information that can be hidden is determined as follows using the sizes of the image and the pixel block.

(Image size)/(pixel block size)/2 [bit]

If, for example, 1×1 pixel blocks are applied to a 384×256 image, the upper limit of the amount of information that can be hidden is 6 Kbytes. The actual limit, however, is smaller because all the pixel block cannot be used for hiding as in the case in which adjacent pixel blocks have the same characteristic value. In addition, this amount may be further reduced because despite the possibility of hiding, the exchange processing is occasionally avoided to prevent image quality from being degraded.

(Image Preservation and Degradation)

Two adjacent pixels on an image with an edge feature extending between the pixels are known to have significantly different brightness values. Thus, the exchange of such two pixels may break the edge feature, resulting in the obvious degradation of image quality. Thus, to prevent the degradation of image quality, a certain threshold is provided for the brightness values to be exchanged. If this threshold is exceeded, this pair can be effectively skipped without exchanging the characteristic value. The threshold may be determined on the basis of a variance value calculated from the image data or local variance values around the blocks.

If the variance value of a block which is close to zero is exchanged with the variance value of another block which is far from zero, the small block is significantly changed, resulting in the obvious degradation of image quality. Thus, the smaller variance value may be compared to the threshold, and if it is smaller than the threshold, the exchange operation may be avoided.

(Endurance of PBC)

Since the characteristic values of adjacent pixel blocks are compared and the data associated with the exchange of the characteristic values is hidden, the hidden information can be retrieved correctly so long as the relative relationship between the blocks is maintained. Thus, even if a hue adjustment or a correction is carried out, the hidden information is expected to be maintained on the basis of the difference in the characteristic value. In addition, if, in the variance value exchange method described above, the pixel block has a size of 8×8, the hidden information can be extracted accurately even after JPEG compression processing. Our experiment showed that 90% of information was maintained even after "compression with loss" was carried out so as to reduce the file size down to 5%. The variance value exchange method is expected to effectively maintain the hidden information even after D/A and A/D conversions such as print/scan operations.

(Extension of PBC)

It should be noted that the above PBC is only illustrative and that many other methods are conceivable. As apparent from the above embodiment, the manipulation of the characteristic value of pixel blocks according to the rule on the difference between characteristic values is important in data embedding and extraction. In this sense, in addition to the exchange of characteristic values as described above, a specific value may be added to one of the characteristic values or subtracted from the other (or both manipulations may be executed simultaneously). In this case, the specified value may be a constant or be varied depending on the conditions of the pixel blocks to be processed. In addition, as an extension of PBC, a rule for associating the signs of characteristic values with binary information may be defined to embed or extract data according to this rule.

The essence of this invention is to use a certain reference value (for example, one of adjacent pixel blocks in image data) to manipulate the other pixel block according to a meaningful rule. That is, data is hidden by manipulating the characteristic value of one of adjacent pixel blocks by referencing a translation rule that associates the contents of the data to be hidden with the difference between a reference value for the characteristic value and the characteristic value of this block. In this sense, according to this invention, the reference need only be clear and able to manipulate characteristic values, and need not necessarily be a specified region (a pixel block) in image data. Thus, the reference may be obtained from data other than image data. For example, a fixed mask pattern with a specified value (a reference value) and the same size as a pixel block may be used as a reference for characteristic value manipulation. In this case, during hiding, the characteristic value of a specific pixel block may be manipulated relative to the reference value in the mask pattern, and during extraction, data may be extracted on the basis of the difference from the reference value.

E. Third Embodiment

This section describes a method of hiding information the reference position. The above data hiding technique selects and processes pixel blocks from an original image and extracts a message from the processed pixel blocks. Thus, the positional information on pixel blocks is essential in extracting messages. The positions of pixel blocks are relatively identified using a certain region in the image (in the first embodiment, the upper left corner of the original image) as a reference. If, however, a third person edits the image, for example, cuts off part of the image, the reference position of the image cannot be identified, thereby preventing the message from being extracted. Referencing FIG. 3(a) again, if part of the original image (the area enclosed by the broken line in the figure) is cut off, the original reference position (the position M[0] of the 0-th array element in the message array) cannot be determined from the remaining screen.

Figure 14:
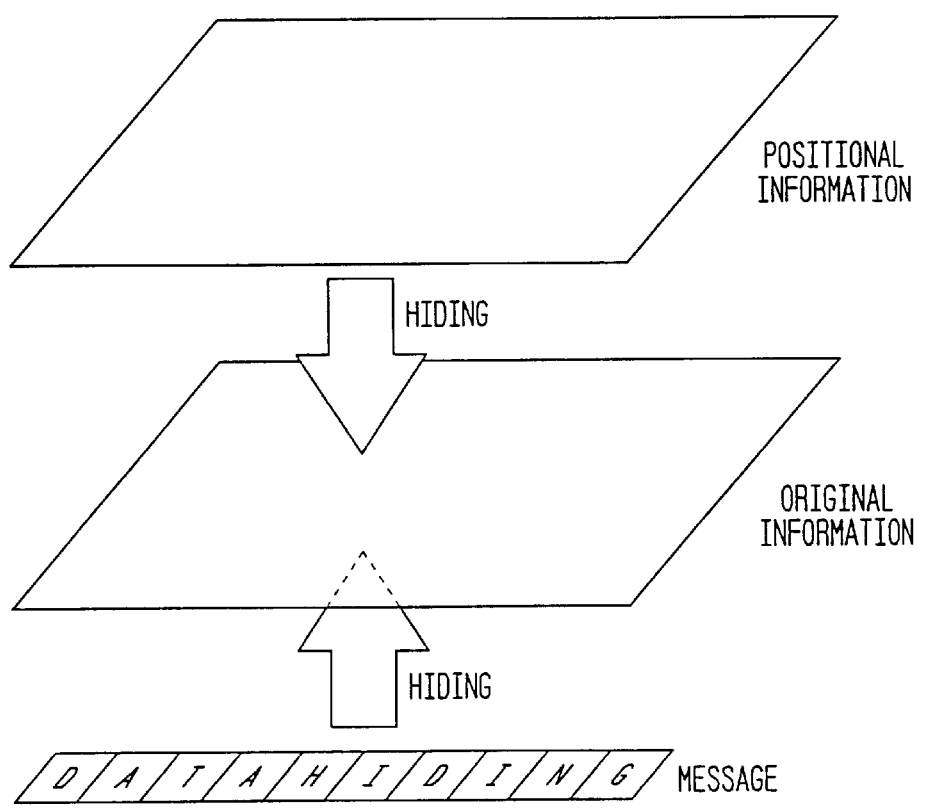
FIG. 14 describes a method for hiding a message and positional information in an original image.

The important requirements for data hiding are that hidden information cannot be removed easily by a third person or can be extracted correctly even if a third person has maliciously modified the data or if the data has been subjected to image compression with loss such as JPEG. Then, in addition to a message, information for identifying the reference position is preferably hidden in the original image as shown in FIG. 14. Hiding such positional information enables the message to be extracted correctly even from a modified or compressed image. Thus, information for identifying the reference position for media data is also hidden in the message data. This information on the reference position is hidden all over the message data. If part of the message data has been cut off, this information enables the reference position for the message data or any position relative to the reference position to be detected from the partial message data that has been cut off. For example, concentric circular arcs around the reference position may be hidden all over the image, as described below.

(Use of Concentric Circular Arcs as Positional Information)

Figure 15:
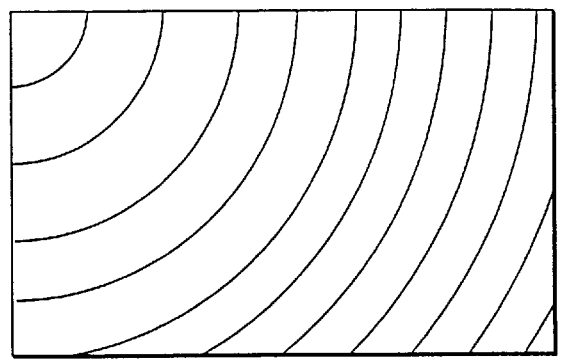
FIG. 15 shows the case in which concentric circular arcs are used as positional information.

Concentric circular arcs as shown in FIG. 15 are used as positional information. These concentric circular arcs are drawn at a specified interval around the upper left corner (the reference position) of the original image. To correctly extract the reference position from a partial image that has been cut off, at least one circular arc must be included in a partial image assumed to be cut off. Consequently, the interval among the concentric circular arcs is set assuming the above conditions.

Figure 16:
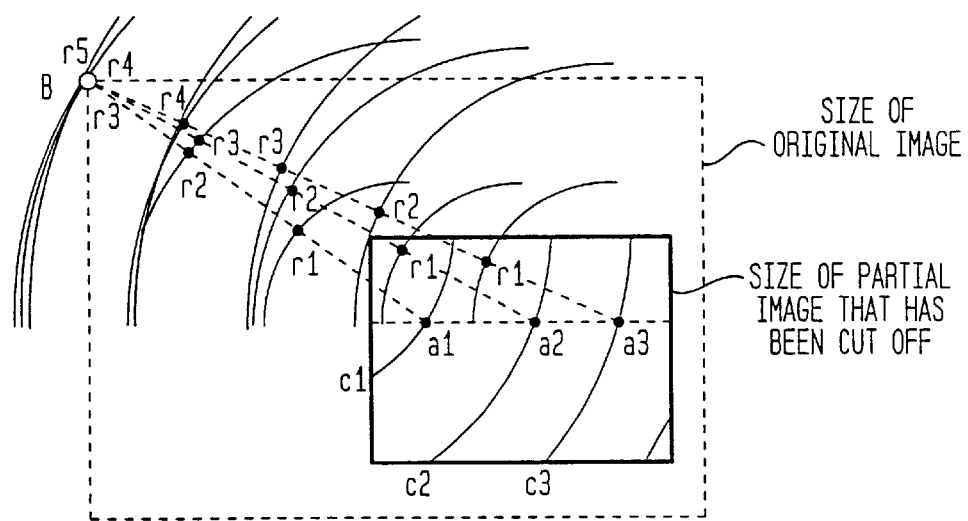
FIG. 16 describes the identification of a reference position B in the case in which concentric circular arcs are used as positional information.

The reference position can be identified using the nature of a circle "if a circle is drawn using a point on the circumference of another circle as the center in such a way that both circles have the same radius, the drawn circumference will pass through the center of the second circle". FIG. 16 describes the identification of a reference position B in the case in which concentric circular arcs are used positional information. First, any three points $(a_1, a_2, a_3)$ present on three concentric circular arcs $(C_1, C_2, C_3)$, respectively, present in the partial image that has been cut off are identified. Next, circles with different radii $(r_1, r_2, r_3, r_4, \ldots)$ are drawn from the respective points. In this case, one of the intersections of the circles at which the largest number of circles intersect one another is identified as the reference position B. Since, in digital images, pixels are diversely arranged like a lattice, the reference position can be identified very accurately by drawing circles as described above.

For circles (with larger radii) remote from the upper left corner (the reference position), the interval between the circular arcs may be reduced in such a way that the partial image includes two or more circular arcs. As the radius of a circular arc becomes larger and larger, the circular arc contains more and more linear elements, resulting in large differences in the calculated values of the reference position. Reducing the interval enables such differences to be reduced because the partial image includes a large number of circular arcs. In addition, by setting the reference position, that is, the center of concentric circular arcs, in both upper left and lower right corners, the size of the original image can be determined from these two centers.

(Hiding with Concentric Circular Arcs)

FIG. 17 describes hiding and extraction methods that use concentric circular arcs as positional information. In FIG. 17(a), a message is hidden in the original image using the method shown in the second embodiment, and concentric circular arcs are subsequently hidden therein as positional information. For example, the LBP of the pixels on the concentric circular arcs is set at "1". LBP is used because changes in this value cause few visible changes in the image. In addition, in FIG. 17(b), positional information is hidden in the original image, and a message is subsequently hidden therein.

(Extraction with Concentric Circular Arcs)

A two-dimensional vote array T is created. The size of the array is determined by considering the maximum size of a partial image expected to be cut off. If, for example, the array has a width of (2 m−1), it can deal with partial images 1/m times as large as the original image at maximum. Each of the elements of the vote array T represents a candidate in the reference position B, and the value of the element represents the number of vote for the candidate. Both coordinates are associated with each other in such a way that the partial image is located in the center of the vote array.

The partial image is scanned, and when a point with an LBP of "1" is encountered, circular arcs of all the known radii on the vote array are drawn around this point. The number of votes for each element of the vote array T is then increased by one. In this case, if this is the point on the circumference at which the point corresponding to each element is hidden, at least one of the drawn circular arcs passes through the original center.

The partial image is alternatively scanned vertically and horizontally, and the above procedure is carried out each time a point with an LBP of "1" is encountered. This allows the position corresponding to the element with the largest number of votes to be identified as the reference point B. The largest number of votes concentrates on the array element of the vote array which corresponds to the reference position. Thus, the present algorithm enables the reference position to be identified correctly despite the effects of noise. The message can then be extracted appropriately from the partial image based on the identified reference position.

Since the method in FIG. 17(a) changes image data with a message hidden therein, the extraction of the information may fail unless a data hiding method resistant to random noise is used. The method in FIG. 17(b), however, does not change the hidden message until it is extracted, so it is more resistant to noise than the method in FIG. 17(a). As a result, this method allows various data hiding methods to be used. It should be noted, however, that part of the information on the reference position according to this invention may be broken.

F. Specific Applications

Specifically, data hiding and extraction methods using the above algorithm are applicable to the following system.

(Television Image CM Occurrence Count)

Figure 18:
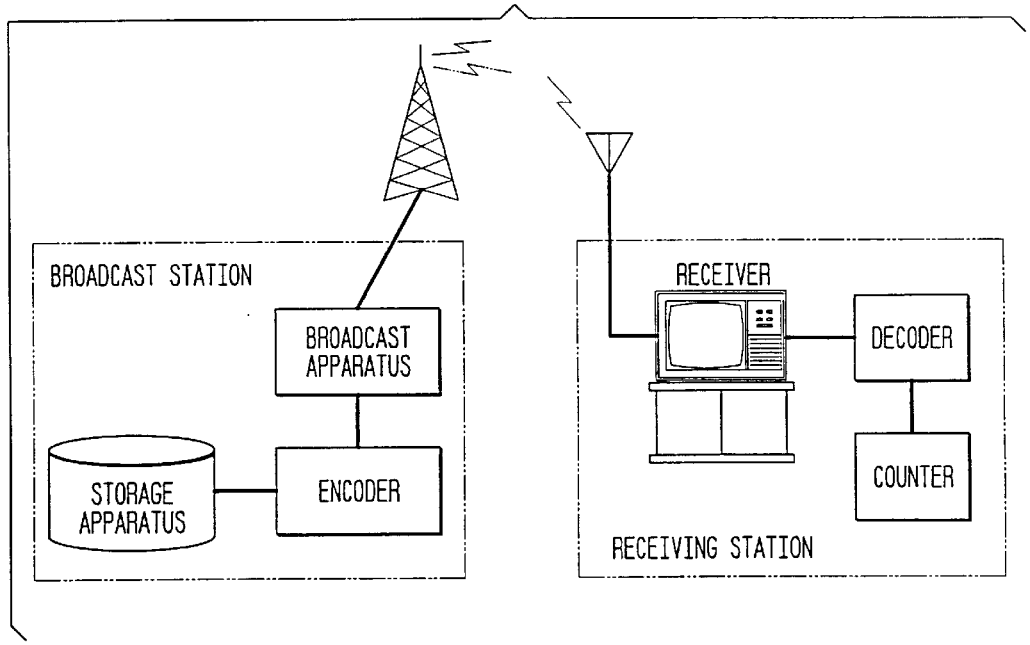
FIG. 18 is a block diagram of a broadcasting system.

Whether a commercial is broadcasted a requested number of times is important to the person who has ordered the broadcasting. The present algorithm can be used to construct a system as shown in FIG. 18 in order to automatically count the number of broadcasts. The broadcast station has a storage apparatus, an encoder, and a broadcasting apparatus. The storage apparatus stores a commercial image, and the encoder hides in the commercial image, information used to count the number of broadcasts. The commercial image with this information hidden therein is broadcasted by the broadcasting apparatus. This system uses the above data hiding method to encode the commercial image. Encoding is carried out based on the data in the counter information, which is dispersively hidden in the commercial image. In addition, a receiving station has a receiver, a decoder, and a counter. The receiver receives the commercial image with the counter information hidden therein. The decoder extracts the counter information from the commercial image. Based on the extracted counter information, the counter counts the number of broadcasts. Such a reception system extracts the counter information based on the above data extraction method. Decoding is carried out by identifying and extracting data from those positions on the commercial image at which the counter information is distributed, based on the data in the counter information.

The broadcast station broadcasts the commercial image with the hidden counter information that enables the number of broadcasts to be counted at the receiving station based on the hiding algorithm. Therefore, the receiving station can count the number of broadcasts by extracting this counter information.

(Censorship at a Firewall)

Figure 19:
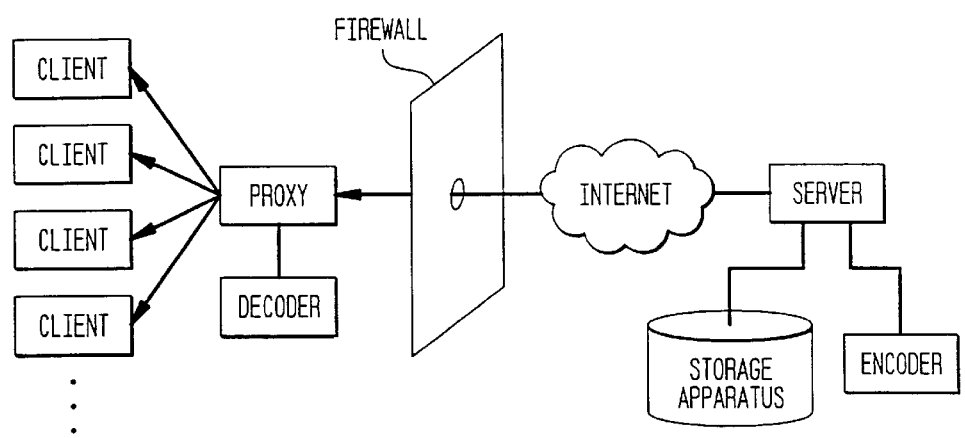
FIG. 19 is a block diagram showing a transmitter and a receiver in Internet.

All the HTTP transmissions inside and outside a topology such as Firewall flow through a proxy located at the topology. This nature can be used to censor images and sound data on the proxy. If media data with a water mark hidden therein is detected, it is left in a log. This enables illegally distributed data to be detected. FIG. 19 is a block diagram of such a system. A server has a storage means in which media data is stored and an encoder for hiding message data in the media data. The server controls the encoder so as to hide message data in the media data read from the storage means, and transmits the output data to Internet. The above hiding method is then used to dispersively hide the message data in the media data based on the contents of the message data. A receiving station has a proxy that receives from Internet the media data that has been subjected to the hiding processing at the transmitting station, and a decoder for extracting the message data from the received data. Extraction is executed by using the above data extraction method to identify the positions of the distributed message data based on the contents of the message data.

(Application to Travel Agency Servers)

Figure 20:
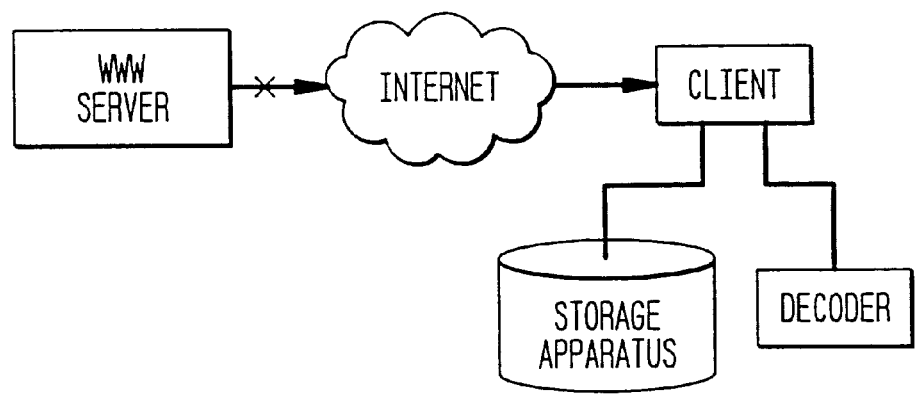
FIG. 20 is a block diagram showing a server and a client.

Additional information such as the description or map of a sight-seeing place, or point information such as URL is hidden in a photograph of the sight-seeing place displayed on a WWW server operated by a travel agency. By using the WWW Browser to network-copy the photograph, the map can be extracted later from the photograph to check the description, transportation, and route. As shown in FIG. 20, the additional information can be extracted even after the client has been disconnected from the WWW server. Compared to the method of separating a file for additional information from a file for photo data, the use of hiding enables the close relationship between the photo data and the additional information to be maintained, thereby allowing the data to be filed easily.

(Finger Printing and Water Marking)

Finger printing refers to the hiding in media data to be issued to a third person, of a mark that enables the issuer of the media data to identify that person. If anyone conducts an illegal act such as illegal copying, finger printing enables the source of the act to be identified. Thus, if this person is illegally distributing the copy, this illegal copy can be charged on him or her.

On the other hand, water marking refers to the hiding in media to be issued to a third person, of a mark that the issuer of the data to identify him- or herself. This ensures that this data has not been modified during distribution, that is, has been issued from the legal issuer and not modified during distribution.

Figure 21:
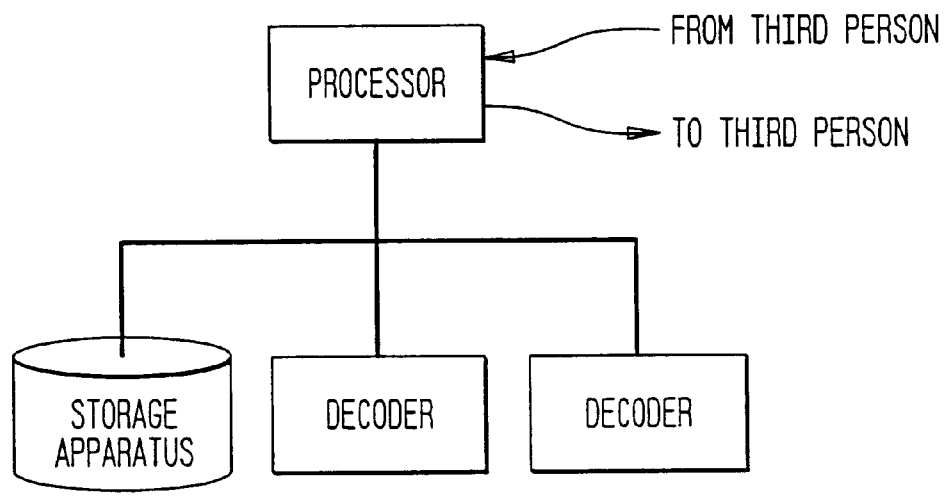
FIG. 21 is a block diagram of a finger printing and water marking system.

To hide such marks, a system such as shown in FIG. 21 can be constructed. When data is issued to a third person, a mark is hidden in the data. To detect the mark, it is extracted from the data obtained from the third person.

In addition to the above systems, this invention is applicable to those systems which use cable or satellite communication or storage media such as DVD-ROMs (DVD-RAMs). In particular, if a DVD-ROM (DVD-RAM) is used to distribute media data, the data includes hidden information on a permission for copying, that is, whether copying is prohibited or allowed. DVD players used by end users to duplicate the media data include a function for limiting copying. Thus, if the copying player extracts a copy permission condition from the medium to find that copying is prohibited, it operates to prohibit copying.

G. Data Extraction Systems and Semiconductor Integrated Circuits Implementing Such Systems Specifically, the above data extraction method can be implemented on systems of the following configuration. In addition, most of the functions of such a system can be provided on a single chip as a semiconductor integrated circuit. The detailed description of the characteristics of such systems and semiconductor integrated circuits is omitted to avoid duplication, but the items and their extensions and variations described in the data extraction method are also applicable to these systems. The details of the following items will be obvious to those skilled in the art from the description of the above methods.

Figure 22:
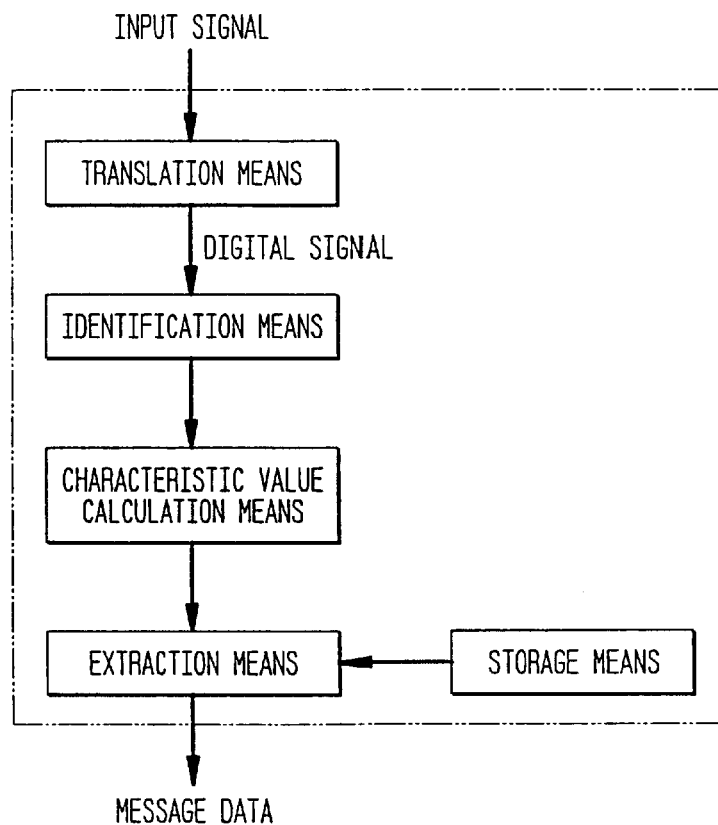
FIG. 22 is a block diagram of a data extraction system.

Specifically, a system for extracting message data from media data has a translation means, an identification means, a characteristic value calculation means, a storage means, and an extraction means, as shown in FIG. 22. The translation means is an A/D converter that converts message data comprising analog signals in which message data is hidden, into digital signals, which are then output by the converter.

The identification means identifies one of those blocks in media data output by the translation means in which message data is hidden. The characteristic value calculation means determines the characteristic value of the block identified by the identification means. The storage means stores a translation rule that associates the contents of the data to be extracted with the difference between a reference value for the characteristic value and the characteristic value of this block. The extraction means references the translation rule to extract the hidden message data depending on the characteristic value of this block.

The reference value is the characteristic value of a second block that is present in the media data and that is different from the first block. The translation rule stored in the storage means states that one of the bits is extracted if the characteristic value of the first block is larger than that of the second block whereas the other bit is selected if the characteristic value of the first block is smaller than that of the second block.

Figure 23:
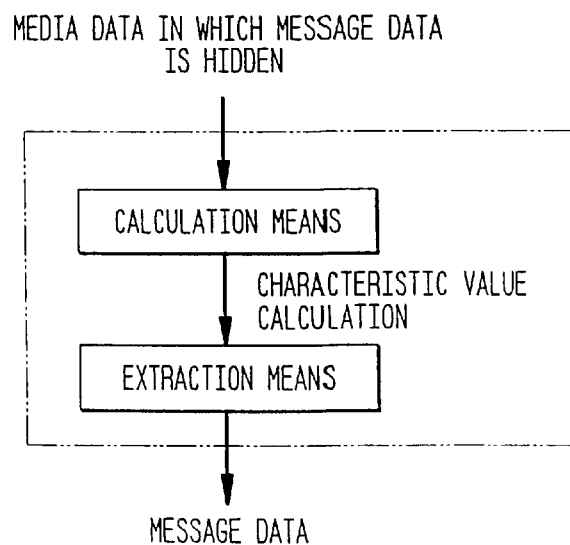
FIG. 23 is a block diagram of a semiconductor integrated circuit with the data extraction system provided on a single chip.

In addition, a semiconductor integrated circuit comprising the above system incorporated in a single chip has, as shown in FIG. 23, at least a calculation means and an extraction means. The calculation means determines the characteristic value of that block in media data comprising input signals which is identified as the one in which message data is hidden. The extraction means extracts the hidden message according to the characteristic value of the block by referencing the translation rule that associates the contents of the data to be extracted with the difference between a reference value for the characteristic value and the characteristic value of this block.

As described above, if message data is dispersively hidden in media data such as an image or sound, this invention determines those positions in which the message is to be hidden based on the contents of both media and message data. Therefore, this invention enables data hiding that prevents a third person from modifying the message easily.

While the invention has been particularly shown and described with respect to preferred embodiments thereof, it will be understood by those skilled in the art that the foregoing and other changes in form and details may be made therein without departing from the spirit and scope of the invention.

Having thus described our invention, what we claim as new, and desire to secure by Letters Patent is:

1. A broadcast system comprising:
   a storage apparatus in which commercial media data is stored;
   an encoder for hiding in said commercial media data, message data used to count the number of broadcasts of said commercial media data; and
   a broadcast apparatus for broadcasting said commercial media data with said message data hidden therein, wherein:
   said message data is dispersively hidden in said commercial media data based on the data in said message data for counting, in which media data is expressed as a media array while message data is expressed as a message array, and in which the elements of said message array are dispersively hidden in said media array based on a state value specifying a particular array element of said media array; and
   (a) means for determining the j-th ($j \geq 0$) state value;
   (b) means for determining (j+1)-th state value based on said j-th state value, the array element of said media array indicated by the j-th state value, and the array elements of said message array; and
   (c) means for hiding data with respect to the array element of said media array indicated by said (j+1)-th state value.

2. The broadcast system according to claim 1 wherein if j=0 in said means for determining in subparagraph (a), the initial state value is determined on the basis of the data in the array elements of said message array.

3. The broadcast system according to claim 1 wherein if j=0 in said means for determining in subparagraph (a), the exclusive OR of the data in all the array elements of said message array is used as an input to said initial function, the output of said initial function being used as said initial state value.

4. The broadcast system according to claim 1 wherein in said means for determining in subparagraph (b), said (j+1)-th state value is determined on the basis of the exclusive OR of said j-th state value, the data in the array element of the media array indicated by the j-th state value, and the data in the array elements of said message array.

5. The broadcast system according to claim 1 wherein in said means for determining in subparagraph (b), the exclusive OR of said j-th state value, the data in the array element of said media array indicated by the j-th state value, and the data in the array elements of said message array is used as an input to a hiding position translation function, the output of said hiding position translation function being used as said (J+1)-th state value.

6. The broadcast system according to claim 5 wherein said hiding position translation function is an enciphering function that uses as a parameter, a secret key used in a public key method.

7. The broadcast system according to claim 1 wherein, in said means for hiding data in subparagraph (c), said hiding data is the exclusive OR of the array element of said media array indicated by said j-th state value and the array elements of said message array.

8. The broadcast system according to claim 1 wherein, in said means for hiding data in subparagraph (c), a first pixel block which corresponds to the array element of said media array indicated by said (j+1)-th state value and a second block are paired and wherein characteristic values of the pixel blocks are manipulated based on a translation rule so as to hide the hiding data.

9. The broadcast system according to claim 8 wherein said second block is adjacent to said first block constituting a pair with the second block.

10. The broadcast system according to claim 8 wherein said translation rule specifies a rule used to manipulate said characteristic values based on the difference in the characteristic value between the respective pixel blocks constituting a pair.

11. The broadcast system according to claim 10 wherein said characteristic value is the brightness value of said pixel block.

12. The broadcast system according to claim 10 wherein said characteristic value is the variance value of said pixel block.

13. A broadcast system comprising:
   a storage apparatus in which commercial media data is stored;
   an encoder for hiding in said commercial media data, message data used to count the number of broadcasts of said commercial media data; and
   a broadcast apparatus for broadcasting said commercial media data with said message data hidden therein, wherein:
   said message data is dispersively hidden in said commercial media data based on the data in said message data for counting, in which media data is expressed as a media array while message data is expressed as a message array, and in which the elements of said message array are dispersively hidden in said media array based on a state value specifying a particular array element of said media array; and
   in which the J elements of said message array are dispersively hidden in said media array based on a state value specifying a particular array element of said media array, further comprising:
   (a) means for determining the j-th ($j \geq 0$) state value;
   (b) means for determining (j+1)-th state value based on said j-th state value, the array element of said media array indicated by the j-th state value, and the array elements of said message array;

(c) means for hiding data with respect to the array element of said media array indicated by said (j+1)-th state value; and (d) means for recursively executing subparagraphs (a) to (c) to hide the J elements of said message array.

14. The broadcast system according to claim 13 further including means for extracting said media array in which said hiding data is hidden; and the last state value.

15. A receiving system comprising:

a receiver for receiving commercial media data including dispersively hidden message data used to count the number of broadcasts of said commercial media data;

a decoder for extracting said message data from said commercial media data; and a counter for counting the number of broadcasts of said commercial media data based on said extracted message data, wherein:

based on the data in said message data for counting, the positions of said dispersively hidden message data in said commercial media data are identified and the message data is then extracted, in which message data is expressed as a message array, in which hiding data including said message data is expressed as a hiding array, while media data with said hiding data dispersively hidden therein is expressed as a media array, and in which said message array is extracted from said media array based on a state value specifying a particular array element of said media array;

(a) means for determining the j-th (j≧0) state value;

(b) means for extracting an array element of said hiding array from the array element of said media array indicated by said j-th state value;

(c) means for determining the (j−1)-th state value based on the j-th state value and said extracted array element of the hiding array; and (d) means for extracting an array element of said message array based on the array element of said media array indicated by said (j−1)-th state value and the extracted array element of said hiding array.

16. The receiving system according to claim 15 wherein in said means for determining in subparagraph (a), the first state value used in starting extraction is provided to an extractor as information required for extraction.

17. The receiving system according to claim 16 wherein the first state value used to start extraction is the last state value generated in hiding said message array.

18. The receiving system according to claim 15 wherein in said means for determining in subparagraph (c), said (j−1)-th state value is determined on the basis of the exclusive OR of said j-th state value and the data in the array element of said hiding array extracted from the array element of said media array indicated by the j-th state value.

19. The receiving system according to claim 15 wherein an extraction position translation function is provided, and wherein in said means for determining in subparagraph (c), the exclusive OR of said j-th state value and the data in the array element of said hiding array extracted from the array element of said media element indicated by said j-th state value, the output of said position translation function being used as said (j−1)-th state value.

20. The receiving system according to claim 19 wherein said extraction position translation function is an decipher-ing function that uses as a parameter, a public key used in the public key method.

21. The receiving system according to claim 15 wherein, in said means for extracting in subparagraph (b), the array element of said hiding array is the exclusive OR of the array element of said media array indicated by said (j−1)-th state value and the array elements of said message array.

22. The receiving system according to claim 15 wherein, in said means for extracting in subparagraph (b), a first pixel block corresponding to the array element of said media array indicated by said j-th state value and a second block are paired and wherein the hidden data is extracted according to the relationship between characteristic values of said first and second pixel blocks constituting a pair on the basis of an extraction rule.

23. The receiving system according to claim 22 wherein said second block is adjacent to said first block constituting a pair with the second block.

24. The receiving system according to claim 22 wherein said extraction rule is based on the difference in the characteristic value between said pixel blocks constituting a pair and corresponds to a translation rule that specifies the manipulation of said characteristic values during hiding.

25. The receiving system according to claim 24 wherein said characteristic value is the brightness value of said pixel block.

26. The receiving system according to claim 24 wherein said characteristic value is the variance value of said pixel block.

27. The receiving system according to claim 24 wherein an initial function used in hiding data in order to determine the initial state value based on the data in the array elements of said message array, and further including:

(f) in said means for extracting in subparagraph (d), each time an element of said message element is extracted, using the data in all the array elements of said message array as an input to determine an extraction end condition that the output of said initial function is equal to said (j−1)-th state value.

28. The receiving system according to claim 27 wherein the exclusive OR of the data in all the extracted array elements of said message array is used as an input to said initial function.

29. The receiving system according to claim 27 wherein in said means for extracting in subparagraph (d), the end of extraction is recognized when the output of said initial function is equal to said (j−1)-th state value.

30. A receiving system comprising:

a receiver for receiving commercial media data including dispersively hidden message data used to count the number of broadcasts of said commercial media data;

a decoder for extracting said message data from said commercial media data; and a counter for counting the number of broadcasts of said commercial media data based on said extracted message data, wherein:

based on the data in said message data for counting, the positions of said dispersively hidden message data in said commercial media data are identified and the message data is then extracted, in which message data is expressed as a message array, in which hiding data including said message data is expressed as a hiding array, while media data with said hiding data dispersively hidden therein is expressed as a media array, and in which said message array is extracted from said media array based on a state value specifying a particular array element of said media array;

(a) means for determining the j-th ($j \geq 1$) state value;
(b) means for extracting an array element of said hiding array from the array element of said media array indicated by said j-th state value;
(c) means for determining the (j−1)-th state value based on the j-th state value and said extracted array element of the hiding array;
(d) means for extracting an array element of said message array based on the array element of said media array indicated by said (j−1)-th state value and the extracted array element of said hiding array; and
(e) means for recursively executing subparagraphs (a) to (c) until an extraction end condition is met.

* * * * *